US012370565B2

(12) United States Patent
Lamboux

(10) Patent No.: US 12,370,565 B2
(45) Date of Patent: Jul. 29, 2025

(54) SYSTEM AND METHOD FOR REFILLING A CONTAINER WITH LIQUID

(71) Applicant: TECHNIPLAST, Louviers (FR)

(72) Inventor: Jean-Philippe Lamboux, Louviers (FR)

( * ) Notice: Subject to any disclaimer, the term of this patent is extended or adjusted under 35 U.S.C. 154(b) by 15 days.

(21) Appl. No.: 18/422,084

(22) Filed: Jan. 25, 2024

(65) Prior Publication Data

US 2024/0246804 A1 Jul. 25, 2024

(30) Foreign Application Priority Data

Jan. 25, 2023 (FR) ........................................ 2300695

(51) Int. Cl.

*B65B 3/12* (2006.01)
*B05B 11/00* (2023.01)
*B05B 11/10* (2023.01)
*B65B 3/18* (2006.01)
*B67C 3/26* (2006.01)

(52) U.S. Cl.

CPC ...... *B05B 11/0097* (2013.01); *B05B 11/0044* (2018.08); *B05B 11/0064* (2013.01); *B05B 11/1046* (2023.01); *B05B 11/1067* (2023.01); *B65B 3/12* (2013.01); *B65B 3/18* (2013.01); *B67C 3/264* (2013.01)

(58) Field of Classification Search

CPC ............. B05B 11/0097; B05B 11/0044; B05B 11/0064; B05B 11/1046; B05B 11/1067; B65B 3/12; B65B 3/18; B67C 3/264

See application file for complete search history.

(56) References Cited

U.S. PATENT DOCUMENTS 4,313,477 A * 2/1982 Sebalos .................. B65D 83/62 141/301
4,314,657 A * 2/1982 Perakis ................. G01F 11/263 222/453
5,947,171 A * 9/1999 Woodruff ............. B65D 23/102 141/354
6,050,309 A * 4/2000 Woodruff ............... B67D 7/344 141/354
6,418,987 B1 * 7/2002 Colasacco ............. B65B 39/001 141/366
6,457,899 B1 * 10/2002 Lin ........................ G09B 23/12 141/319

(Continued)

FOREIGN PATENT DOCUMENTS

FR 3034031 A1 9/2016
FR 3037577 A1 12/2016
FR 3099921 A1 2/2021

OTHER PUBLICATIONS

English abstract of FR3034031.

*Primary Examiner* — Nicolas A Arnett

(57) ABSTRACT

System for refilling with liquid a second inverted bottle disposed above a first bottle containing liquid via a filling interface, disposed between the two bottles, comprising a valve in two elastically deformable parts. Depending on the intensity of the application of a downward vertical force on the second bottle, the pump of this bottle is first depressed to open the vent under a first force, and, then, the valve deforms elastically under a second, more intense force in order to cause the transfer of the liquid from the first to the second bottle.

17 Claims, 16 Drawing Sheets

(56) References Cited

U.S. PATENT DOCUMENTS

| | | | | | |
|---|---|---|---|---|---|
| 6,938,650 | B2 * | 9/2005 | Mitchell | B60T 17/222 222/479 |
| 8,430,134 | B2 * | 4/2013 | Gill | B65D 47/06 141/391 |
| 8,544,692 | B2 * | 10/2013 | Rusch | B67D 1/0889 222/404 |
| 8,925,593 | B2 * | 1/2015 | Lamboux | A45D 34/02 141/285 |
| 9,834,327 | B2 * | 12/2017 | De Rosa | B65B 3/06 |
| 10,365,141 | B2 * | 7/2019 | Freiburger | B01F 35/80 |
| 10,399,103 | B2 * | 9/2019 | Lamboux | B05B 11/1001 |
| 10,526,192 | B2 * | 1/2020 | Holley | B67D 7/344 |
| 11,440,039 | B2 * | 9/2022 | Lamboux | B05B 11/0044 |
| 2007/0277902 | A1 * | 12/2007 | Dieudonat | B65D 47/248 141/319 |
| 2018/0141066 | A1 * | 5/2018 | Lamboux | B05B 11/1001 |
| 2021/0283629 | A1 * | 9/2021 | Lamboux | B05B 11/0044 |
| 2024/0278269 | A1 * | 8/2024 | Lamboux | B05B 11/0097 |
| 2024/0342737 | A1 * | 10/2024 | Lamboux | B67D 7/0288 |

* cited by examiner

SYSTEM AND METHOD FOR REFILLING A CONTAINER WITH LIQUID

TECHNICAL FIELD

The present invention relates to the field of liquid recharging, or refilling, of a bottle to be recharged from a source bottle called recharge. The present invention relates more particularly to a system for recharging with liquid at least one bottle to be recharged from a recharge via a filling interface and, also, to a method for recharging with liquid from at least one bottle to be recharged from a recharge via a filling interface.

PRIOR ART

A system for refilling a bottle with liquid is known from patent FR 3 037 577 said system comprises:

- a first bottle containing liquid and comprising a bottom at one end and an opening for the liquid to exit the bottle at an opposite end, the opening being located above the bottom,
- a second bottle to be refilled with the liquid from the first bottle, the second bottle comprising a bottom at one end and a pump mounted on the bottle at an opposite end, the pump being equipped with a vent port which is capable of being opened or closed depending on the position of the pump, the second bottle being in the inverted position with the pump located below the bottom of said bottle,
- a filling interface disposed between the two bottles and comprising, on the one hand, a liquid passage for the transfer of the liquid under pressure, from the first bottle to the second inverted bottle through the open vent port of the pump of said second bottle and, on the other hand, a passage of air for the evacuation of the air contained in the second inverted bottle towards the outside of said bottle.

Such a system is used to refill bottles without having to remove the pump equipping these bottles and without questioning the very design of the bottles existing on the market. Indeed, such a pump is quite often mounted on the bottle in such a way as to make its dismantling impossible, or very difficult, without damaging the pump and/or the bottle.

Several examples of particularly satisfactory filling interfaces are described in this document. However, there is a need to design a new filling interface which is even simpler to use from the user's point of view in order to simply and efficiently recharge a bottle to be recharged with a liquid from a liquid recharge, through this interface.

DISCLOSURE OF THE INVENTION

The object of the invention is therefore a system for refilling a bottle with liquid, comprising:

- at least a first bottle S containing liquid and comprising a bottom at one end and an opening for the liquid to exit from the bottle at an opposite end, the opening being located above the bottom,
- at least a second bottle R to be refilled with the liquid from the first bottle S, the second bottle comprising a bottom at one end and a pump mounted on the bottle at an opposite end, the pump being equipped with at least one vent port which is capable of being opened or closed depending on the position of the pump, the second bottle R being in the inverted position with the pump located below the bottom of said bottle,
- a filling interface disposed between the two bottles and comprising, on the one hand, at least one liquid passage for transferring the liquid under pressure, from the first bottle S to the second inverted bottle R through said opened at least one vent port of the pump of said second bottle and, on the other hand, at least one air passage for the evacuation of the air contained in the second inverted bottle R towards the outside of said bottle, characterized in that the filling interface includes an elastically deformable valve comprising two parts which are elastically deformable under the action of a downward vertical force, called deformation force, exerted on the second inverted bottle R and having a predetermined intensity, each part of the valve comprising a portion of said at least one liquid passage, the two parts of the valve comprising:

- a first part disposed opposite the pump of the second inverted bottle R and which is configured to be used as a support for the pump without deforming under the action of a downward vertical force, called depression force, which is exerted on the second inverted bottle R so as to depress the pump inside this second bottle in order to open said at least one vent port,
- a second part disposed, on the one hand, below the first part and against it and, on the other hand, opposite or inside the opening of the first bottle S, the second part being configured to be in two states, namely a first non-elastically deformed state in which the portion of said at least one liquid passage which extends inside the second non-deformed part of the valve is obstructed and, a second elastically deformed state in which the second part is elastically deformed and the portion of said at least one liquid passage is no longer obstructed, the second elastically deformed state being obtained under the action of a downward vertical force which is exerted on the second inverted bottle R and which has an intensity at least equal to the predetermined intensity of the deformation force.

The aforementioned system allows to simply and efficiently transfer liquid under pressure from the first bottle to the bottle to be refilled with the liquid contained in the first bottle using an elastically deformable valve in two parts as a filling interface and using a force suitable to first cause the pump to be depressed, then the valve to deform for transferring the liquid and therefore refilling. The gestures for implementing such a system are particularly simple for the user since all they need to do is turn over the bottle to be refilled, position it against the elastically deformable valve and press on the inverted bottle. The user does not need to first attach the bottle to be refilled to any piece, in particular to the elastically deformable valve. Moreover, the two-part elastically deformable valve does not use moving pieces such as metal springs (for example made of stainless steel) which are difficult to recycle.

According to other possible characteristics:

- the pump mounted on the second inverted bottle R comprises a fixed part at one end of which extends, away from the fixed part, a sliding pin which is capable of adopting, on the one hand, a depressed position inside the fixed part and said at least one vent port of the pump is open in this depressed position and, on the other hand, an extended position relative to the fixed part and said at least one vent port of the pump is closed in this extended position, the first part of the valve being disposed opposite the fixed part and the sliding pin of the pump and comprising, on the one hand, a first receptacle configured to be used as a support for the fixed part of the pump and, on the other hand, a second receptacle configured to be used as a support for the pin of the pump;

the first receptacle and the second receptacle respectively have a flared shape towards the fixed part and the pin of the pump so that, on the one hand, the first receptacle is configured to be used as a support for fixed parts of pumps of different dimensions (belonging to a predetermined range of dimensions or external diameters of fixed parts of pumps) and, on the other hand, the second receptacle is configured to be used as a support for pins of pumps of different dimensions (belonging to a predetermined range of dimensions or external diameters of pump pins);

the first receptacle and the second receptacle respectively have a flared shape towards the fixed part and the pin of the pump which is configured to be used as a support respectively for a fixed pump part and for the pin of the pump which have an inclination relative to the vertical;

the inclination with the vertical is generally comprised between less than 15°, or even 10°;

the flared shape of each receptacle is frustoconical;

the frustoconical shape of the first receptacle is defined by a cone angle comprised between 80 and 100° and/or the frustoconical shape of the second receptacle is defined by a cone angle comprised between 5 and 25°;

the portion of said at least one liquid passage which extends inside the second part of the valve is made in two parts which are disjointed when the second part of the valve is not deformed and which communicate with each other when the second part of the valve is deformed;

the filling interface includes an intermediate piece which is mounted on the first bottle S and on which is supported the valve;

the second part of the valve is arranged against the intermediate support piece in such a way that, when the second part of the valve is not deformed, the two disjointed parts of the portion of said at least one liquid passage open onto the intermediate support piece and, when the second part of the valve is deformed, the two parts of the portion of said at least one liquid passage move away from the intermediate support piece.

The invention also relates to a method for refilling a bottle with liquid, characterized in that the method is implemented using a system which comprises:

at least a first bottle S containing liquid and comprising a bottom at one end and an opening for the liquid to exit from the bottle at an opposite end, the opening being located above the bottom, at least a second bottle R to be refilled with the liquid from the first bottle S, the second bottle comprising a bottom at one end and a pump mounted on the bottle at an opposite end, the pump being equipped with at least one vent port which is capable of being opened or closed depending on the position of the pump, the second bottle R being in the inverted position with the pump located below the bottom of said bottle, a filling interface disposed between the two bottles and comprising a valve comprising a first and a second elastically deformable parts which each include a portion of at least one liquid passage for the transfer of the liquid under pressure, from the first bottle S to the second inverted bottle R and, at least one air passage for evacuating the air contained in the second inverted bottle R towards the outside of said bottle, the pump of the second inverted bottle R being supported on the first part of the valve disposed opposite thereto and the second part of the valve being disposed, on the one hand, below the first part and against it and, on the other hand, opposite or inside the opening of the first bottle S, the method comprising:

the application to the second inverted bottle R of a downward vertical force, called depression force, having an intensity less than a predetermined intensity which corresponds to a deformation force, so that the pump of the second inverted bottle supported against the first valve part is depressed inside this second inverted bottle without deformation of the valve, in order to open said at least one vent port of the second inverted bottle, when the valve is not deformed, said at least one liquid passage being obstructed and preventing the transfer of the liquid under pressure from the first bottle S to the second inverted bottle R, the application to the second inverted bottle R of a downward vertical force having an intensity at least equal to the predetermined intensity of the deformation force in order to elastically deform the first and second valve parts, and to free said at least one liquid passage from any obstruction to allow the transfer of the liquid under pressure from the first bottle S to the second inverted bottle R.

The method has the same advantages as those mentioned above in relation to the system and will therefore not be repeated.

Moreover, in practice the two forces applied to the inverted bottle (to be refilled) can be applied in continuity with each other, in a simple manner, by increasing the intensity of the force applied (increase in the support pressure). However, depending on the circumstances, the two forces can be exerted separately, by first obtaining a depression state (with or without stopping the action from the user), then by increasing the force to obtain a deformed state of the valve and thus allow refilling.

According to other possible characteristics:

to transfer liquid from the first bottle S to the second inverted bottle R:

either the liquid present in the first bottle is already under pressure when the force of intensity at least equal to the predetermined intensity of the deformation force is applied; or a pressure is applied to the liquid present in the first bottle during the implementation of the method (the pressurization of the liquid can in particular be carried out when the forces are applied or even after); the first part of the valve comprising, on the one hand, a first receptacle of flared shape configured to be used as a support for a fixed part of the pump of the second inverted bottle and, on the other hand, a second receptacle of flared shape configured to be used as a support for the pin of said pump, the second inverted bottle being inclined relative to the vertical in such a way that the fixed part of the pump and the pin of said pump inclined relative to the vertical are respectively supported against the first receptacle and the second receptacle (the inclination with the vertical is generally comprised between less than 15°, or even 10°).

BRIEF DESCRIPTION OF THE DRAWINGS

Other characteristics and advantages will appear during the description which follows, given only by way of non-limiting example and made with reference to the appended drawings, in which.

DESCRIPTION OF EMBODIMENTS

The invention which is described below with reference to the appended drawings relates in particular to a system for refilling a bottle or container with liquid and an associated method. Generally, the bottle to be refilled or recharged has already been used to dispense liquid such as fragrance or other liquid that has been consumed and the bottle must therefore be filled again to the extent that it is empty or nearly empty.

Figure 1:
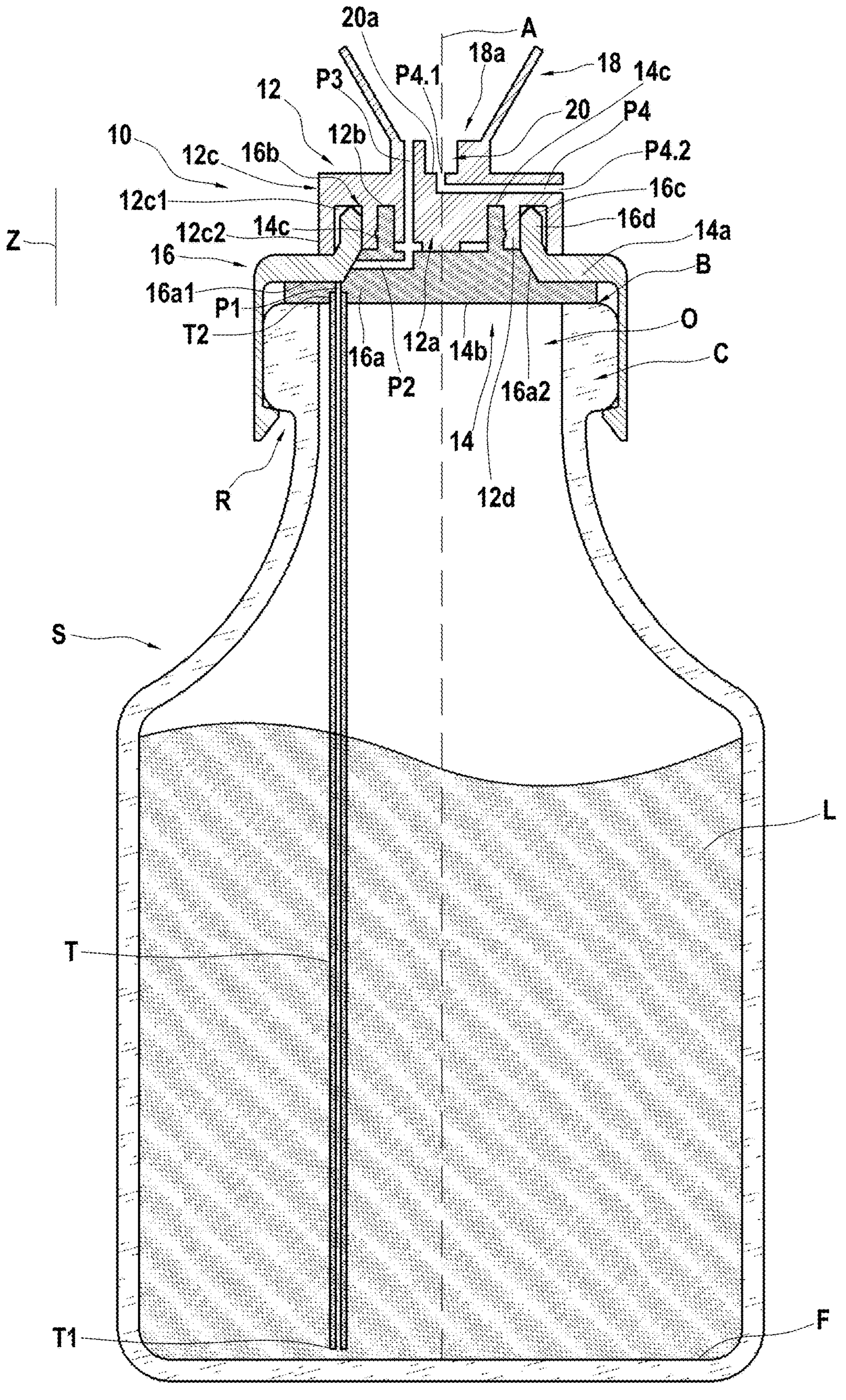
FIG. 1 is a schematic view in longitudinal section of a part of a liquid refilling system from a source bottle S according to one embodiment of the invention.

FIG. 1 shows part of an embodiment of the refilling system in which the bottle to be refilled is not shown. Only a bottle or source container S (recharge) which contains liquid as well as a specific filling interface are illustrated. In particular, the source bottle S comprises, at one of its two opposite ends (lower end), a bottom F and, at its upper opposite end, a neck C bordering an opening O through which the liquid can enter or leave the bottle. The source bottle S also includes a dip tube or suction tube T which extends, here substantially vertically, inside the bottle to a distance close to the bottom of the latter so as to be able to suck, by its lower end T1, as much liquid L contained in the bottle as possible. The upper end T2 is, in turn, connected to the filling interface which will be described below and which acts as a sealed valve in the state of the system of FIG. 1. In this embodiment, the external envelope of the bottle S is rigid and contains liquid L under pressure. The liquid can be conditioned under a pressure, for example of the order of 6 to 8 bars. The volume of liquid contained in the source bottle can, for example, be 300 mL. It should be noted, however, that other variant embodiments are possible for the source bottle such as those described in relation to FIGS. 7A to 10B.

As shown in FIG. 1, a filling interface 10 is mounted on the source bottle S so as to ensure sealing the bottle at its opening O. More particularly, the filling interface 10 comprises a valve in two parts which are elastically deformable when they are subjected to a compressive force (along the vertical axis Z) of appropriate intensity. This force is called deformation force. For a force applied with an intensity lower than the intensity corresponding to the deformation force, the two parts of the valve do not deform and maintain the undeformed and sealed position represented in FIG. 1. Elastic deformation of a piece means a mechanical deformation of this piece in certain proportions or dimensions (that is to say with a limited amplitude of deformation which depends on the material of the piece and the intensity of the force exerted thereon) when subjected to a determined force. When the deformation force ceases to be applied, the piece returns to its initial shape and the operation can be repeated a large number of times over time without the piece being damaged. In the example described, the valve is made entirely of plastic without using any metal spring.

The valve thus comprises a first part 12 and a second part 14 (both elastically deformable) which are disposed one above the other and in mechanical contact with one another. In the example shown, the two valve parts 12, 14 are mechanically engaged with each other, for example nested or snap-fitted together. The second (lower) valve part 14 is disposed opposite the opening O of the bottle S and, more particularly, rests on the upper free edge B of the neck C which surrounds the opening. In a variant not shown, the second valve part can penetrate inside the neck of the bottle and therefore the opening thereof.

The second valve part 14 comprises a first portion of a liquid passage or conduit and the first part 12, which will be described later, comprises a second portion of the liquid passage or conduit. The complete liquid passage (formed by the first and second liquid passage portions) which extends through the two parts 12, 14 of the valve allows, when open (free of any obstruction), to establish a fluidic communication between the interior of the source bottle S and the outside of the valve and to extract liquid under pressure from the source bottle to transfer it out of the valve and, as will be seen later, to transfer it into a bottle to be refilled which will be fluidly connected to the valve.

The first liquid passage portion which extends in the second valve part 14 includes two disjointed parts P1 and P2 which, in the undeformed state of the valve of FIG. 1, do not allow to establish fluid communication between these two parts.

The part of the system shown in FIG. 1 also includes an intermediate piece 16 which is mounted on the source bottle S and on which is supported the valve. The intermediate piece 16 is, for example, a ring which is mounted both on the neck C of the source bottle and on the second valve part 14 so as to firmly hold this second part against the edge B of the bottle to ensure the sealing of the valve-bottle assembly. It will be noted that the ring 16 is, here, more particularly snap-fitted onto the lower flange R of the neck (opposite the upper edge B) but it could however be fixed to the bottle in a different way in other examples of embodiment not shown (for example by screwing onto an external thread of the neck C). In the undeformed position of FIG. 1, the two disjointed parts P1 and P2 both open through one of their opposite ends onto an internal face 16*a* of the intermediate piece 16. This internal face 16*a* thus obstructs/blocks the free end opposite each of the two parts P1 and P2 and therefore the liquid passage of the valve. This assembly is thus sealed with respect to the liquid contained in the source bottle. The ring 16 also has a central opening 16*b* in which the two valve parts extend axially (here vertically) one above the other. The central opening 16*b* is aligned with the opening O of the bottle.

The first valve part 12 is disposed above the second valve part 14 and is engaged with/fixed to the latter for example by mechanically nesting or snap-fitting the two parts into each other. The first part 12 is also disposed above the intermediate piece 16 so as to cover it and to rest thereon. The first part 12 comprises a second portion P3 of the liquid passage, here extending vertically, which communicates fluidly, at one end, with the second part P2 of the first liquid passage portion and opens onto the outside of the valve, at its opposite end.

The first valve part 12 also comprises a passage or conduit P4 for the air which extends through this first part, from a first free end P4.1 to a second opposite free end P4.2, each free end opening onto the outside of the valve.

The first valve part 12 comprises a first receptacle 18 having a generally flared or funnel shape which is open onto the outside of the valve (oriented upwards in FIG. 1) and which has a tightened portion at a bottom 18*a* of the receptacle 18. In the example illustrated, the general flared shape is substantially frustoconical and has a symmetry of revolution around the central axis A, here vertical.

The first part 12 further comprises a second receptacle 20 disposed inside the first receptacle 18 and, more particularly, at the bottom 18*a* of the latter. This second receptacle 20 is in the shape of a cavity formed inside the first valve part 12 and which extends downwards in FIG. 1, away from the bottom 18*a*. The end P4.1 of the passage P4 opens into the bottom 20*a* of the second receptacle 20 and the opposite end P4.2 opens onto one of the external side walls of the first valve part 12. The second portion P3 of the liquid passage extends from the bottom 18*a* of the first receptacle 18 towards the second valve part 14 and the second part P2 of the first liquid passage portion.

More particularly, in the example shown in FIG. 1, the second valve part 14 may comprise a body having a general disc shape with, on the one hand, a first peripheral portion 14*a* which is enclosed between the free edge B of the neck of the bottle and an internal lower face 16*a*1 of the intermediate piece 16 and, on the other hand, a second central portion 14*b* axially thicker than the peripheral portion 14*a* and which extends axially in the opening 16*b* of the intermediate piece 16 until it contacts the lower face of the first valve part 12. The peripheral portion 14*a* integrates the part P1 of the liquid passage portion which extends axially (vertically) until it contacts the lower face 16*a*1 of the intermediate piece 16. The peripheral portion 14*a* is also connected by its lower face to the end T2 of the dip tube (this end T2 is for example pressed into a recess made in the lower face of the peripheral portion 14*a*). The central portion 14*b* integrates the part P2 of the first liquid passage portion which extends substantially forming an elbow, including a horizontal portion which extends to the internal face 16*a* of the intermediate piece, more particularly up to a portion of the internal face 16*a* which here forms a surface 16*a*2, for example of frustoconical shape (flared downwards). The part P2 also includes a vertical portion which extends from the horizontal portion to the lower face of the first valve part 12, in alignment with the portion P3 of the latter. The second valve part 14 also includes one or more engagement portions 14*c* which extend axially upwards from the upper face of the central portion 14*b*, so as to engage inside the first portion 12 of the valve, in one or more corresponding cavities of complementary shapes. In the example illustrated, the engagement portion 14*c* is for example in the shape of an annular wall which can include one or more projecting members (for example bosses) radially on its exterior face so as to form one or more axial retainers when this wall 14*c* is engaged inside the first valve part 12.

The first valve part 12 may more precisely comprise a body having a central part 12*a* engaged inside the opening 16*b* of the intermediate piece 16. A recess of annular shape 12*b* is formed in the central part 12*a* to receive the wall of annular shape 14*c* described above. Depending on the shape and number of the engagement portions 14*c* of the second valve part 14, the central part 12*a* is shaped in a corresponding and complementary manner. These engagement means constitute a possible example of means for nesting or snap-fitting the two valve parts together. Generally and independently of the shape and number of the engagement portions 14*c*, the assembly of the two valve parts 12 and 14 with the intermediate piece 16 mounted on the neck of the bottle S allows to ensure a sealing, which is here cylindrical, between the internal face of the neck 16*d* of the piece 16 which borders the central opening 16*b* and the external face of the central part 12*a* of the first valve 12 which is engaged in the central opening 16*b*. In the example described, the cylindrical contact takes place between the internal face of the neck 16*d* and an external peripheral portion 12*d* which is engaged radially with the annular wall 12*c*, the external peripheral portion 12*d* sparing here, with the most central portion of the central part 12*a*, a peripheral housing to accommodate the annular wall 12*c*. Other shapes and possibilities of engagement between the two valve parts 12 and 14 are of course possible and the latter can also have different conformations. The central part 12*a* also integrates the liquid passage portion P3 which, here, is offset radially relative to the central axis of the piece by being positioned inside the cavity 12*b*. The body of the first valve part 12 also includes a peripheral part 12*c* which extends radially away from the central part 12*a* and which has an annular groove 12*c*1 open towards the bottom and in which the upper peripheral free edge 16*c* bordering the opening 16*b* of the intermediate piece 16 is axially engaged. The peripheral part 12*c* thus shaped includes an external skirt of axial extension 12*c*2, which is substantially annular, which externally delimits the cavity 12*c*1. This peripheral part 12*c* thus shaped covers the upper free edge 16*c* of the intermediate piece 16 and, in the position of FIG. 1, the first valve part 12 is thus supported on this upper free edge. In this figure, the upper free edge 16*c* has, along this axial section, a generally substantially triangular shape and the bottom of the cavity 12*c*1 is supported on the tip of the triangle. It should be noted, however, that other shapes of the upper free edge of the intermediate piece 16 can alternatively be used to contribute to the sealing between the intermediate piece 16 and the peripheral part 12*c* of the body of the first valve part 12. The liquid passage portion P4 extends, in turn, in an elbowed shape first vertically in the central part 12*a* from the end P4.1 and then horizontally in this part, then in the peripheral part 12*c* to exit laterally from the second valve part 12 via the end P4.2.

The shapes of the first and second valve parts which have just been described can of course vary to the extent that they retain the same functional characteristics, namely that they are elastically deformable and, in a non-elastically deformed state, ensure the sealing at the opening O of the source bottle, that they integrate liquid passage portions with two disjointed portions in a non-elastically deformed state of the second valve part, and that these disjointed portions fluidly communicate with each other in an elastically deformed state. Moreover, the first valve part 12 is configured to be used as a support without deforming under the action of a downward vertical force whose intensity is less than the intensity of the deformation force which allows to cause the elastic deformation of the valve.

Figure 2:
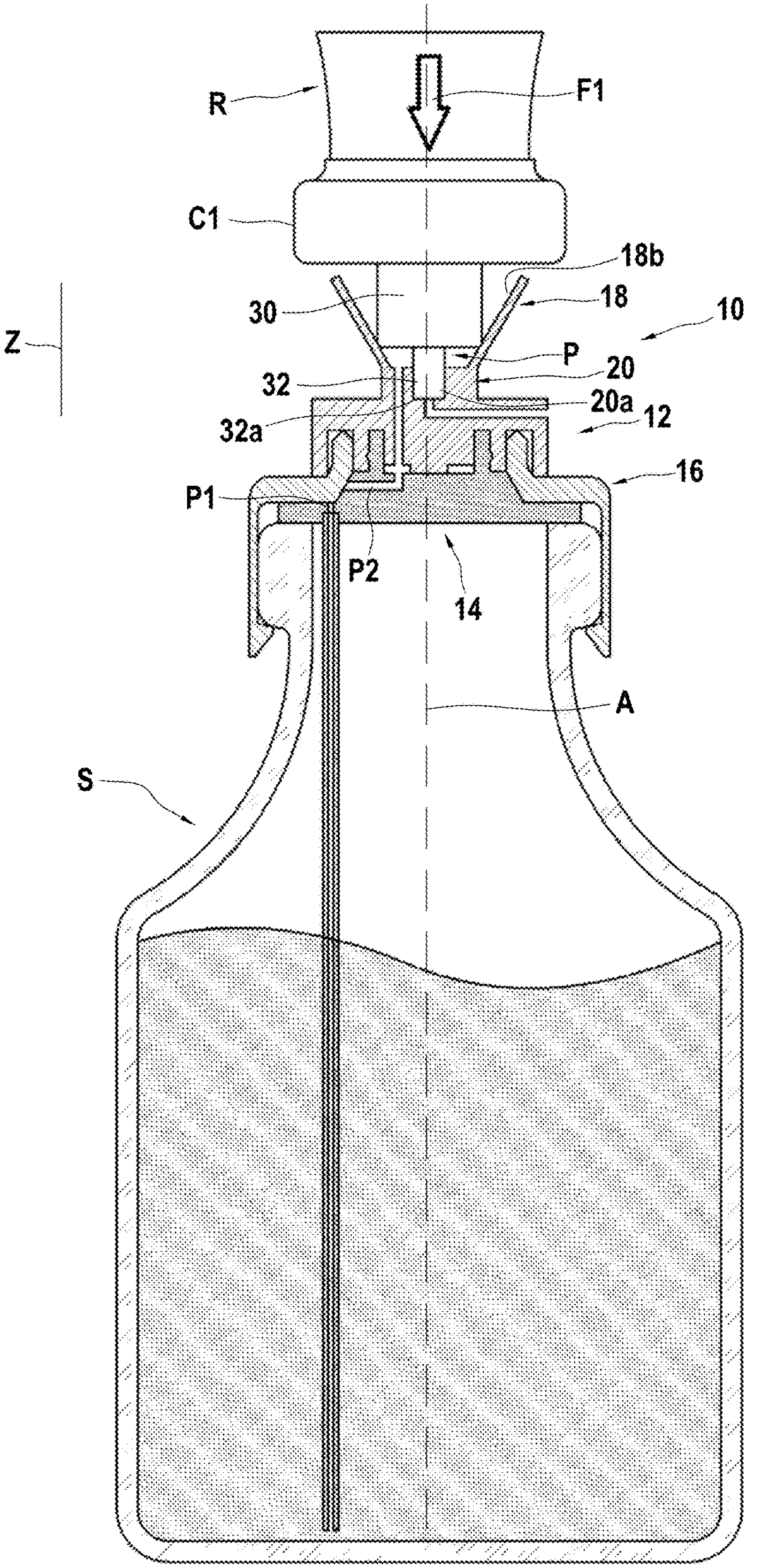
FIG. 2 is a schematic view in longitudinal section of a complete system for refilling a bottle R with liquid from a source bottle S including the part of the system of FIG. 1 according to one embodiment of the invention.

A complete liquid refilling system according to one embodiment is shown in FIG. 2. This system comprises the liquid recharge formed by the first container or source bottle S described above and a second container or bottle R (single bottle) to be refilled/recharged with liquid from the recharge 12.

The second bottle R comprises a bottom disposed at one end of the bottle and a pump mounted on the bottle, in a manner not necessarily removable, at an opposite end. The pump is equipped with at least one vent port which is able to be opened or closed depending on the position of the pump relative to the bottle (depressed or not depressed, that is to say at rest). The second bottle R is generally a conventional type bottle, that is to say that when it is used typically, a push-button or diffuser, not shown here, is generally mounted on the pump in order to be able to actuate it from a rest position (not depressed), and thus distribute the liquid in a conventional manner from the bottle. For the implementation of the invention, the push-button or diffuser is removed in order to leave accessible, from outside the bottle, a projecting part of the pump mechanism, namely the pump actuation pin. As shown in FIG. 2, a cap C1 is for example crimped onto the neck of the bottle R in particular to prevent the pump P from being dismantled and to seal the bottle. The bottle R is generally made of a rigid material, for example glass or aluminum.

As shown in FIG. 2, the bottle R is in an inverted position relative to a normal and conventional position of use, that is to say that the pump P of the bottle R is disposed below the bottom (not shown) of the latter. The inverted bottle R is brought, pump downwards, above the filling interface 10 and in contact with the latter.

Figure 3A:
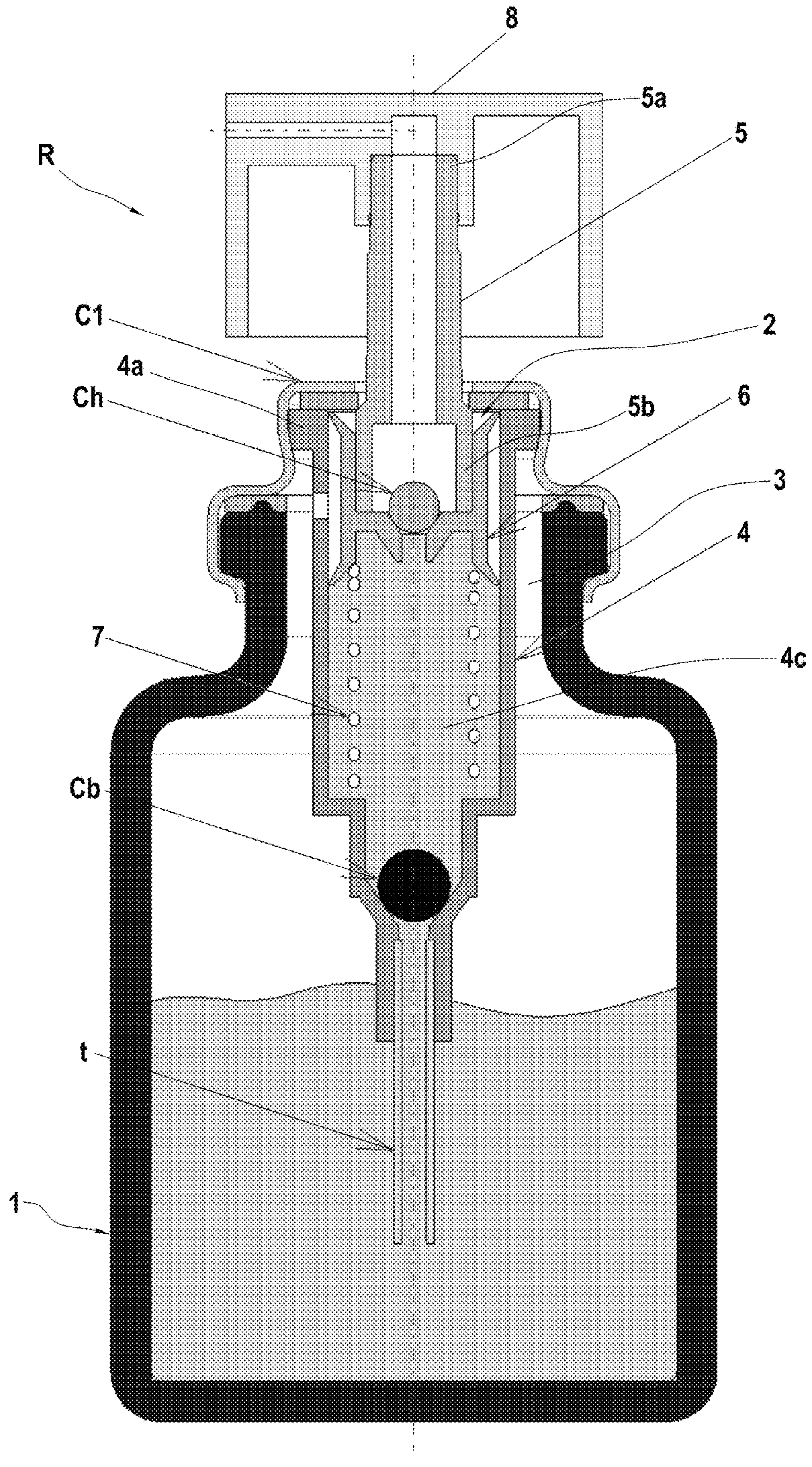
FIG. 3A is a simplified schematic view in longitudinal section of an internal mechanism of a bottle to be refilled equipped with a pump in the rest position.
Figure 3B:
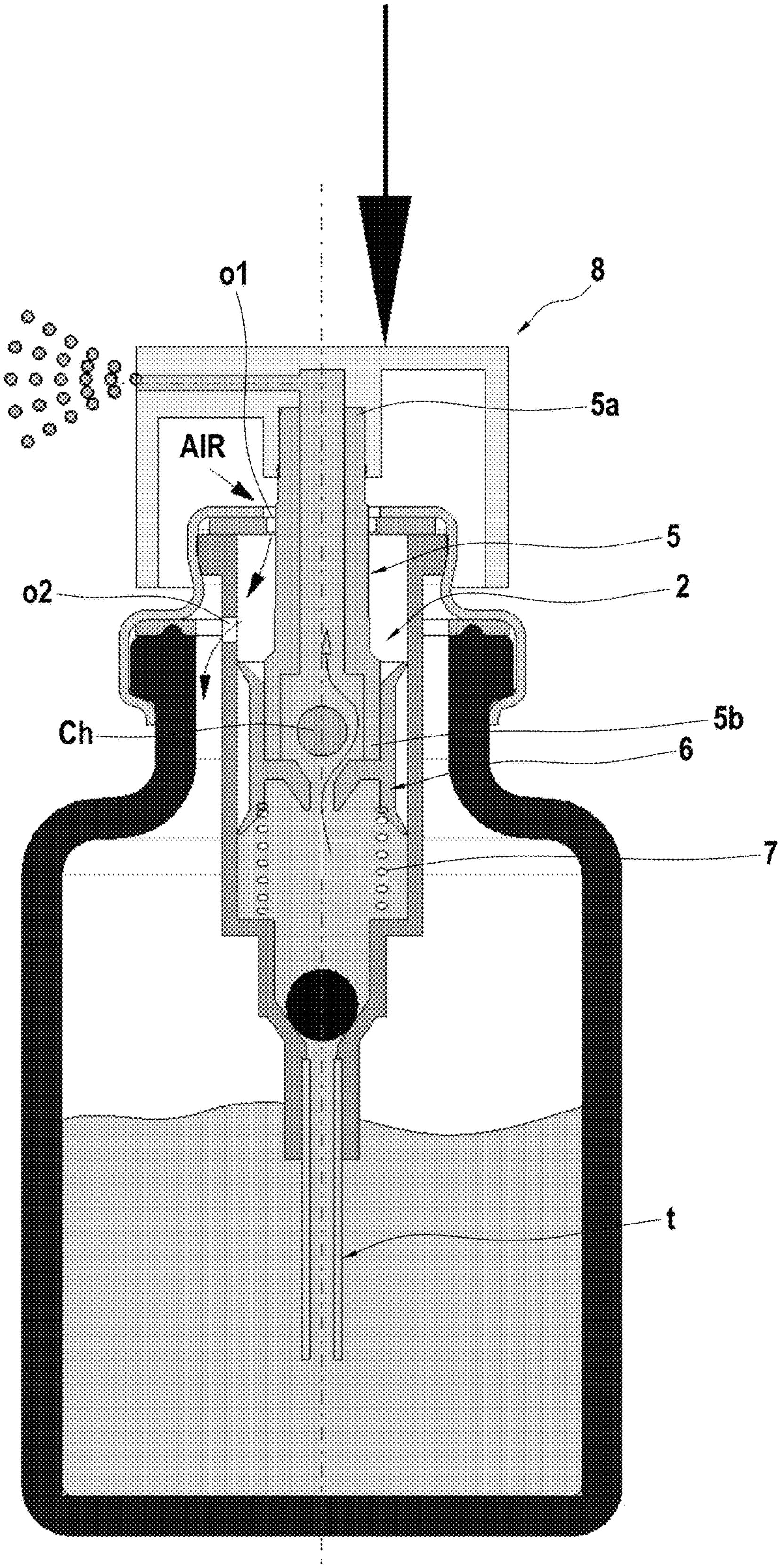
FIG. 3B is a schematic view showing the internal mechanism of the bottle to be refilled in FIG. 3A when the pump is in the depressed position.

FIGS. 3A and 3B illustrate an example of a possible embodiment of a conventional type bottle R to be recharged. In FIG. 3A, the bottle R is at rest (not used) with its pump in the high position and in FIG. 3B, the bottle is in use with its pump depressed in the low position. Generally speaking, the bottle R comprises a container 1, for example a rigid container, with liquid, a pump 2 mounted through the opening 3 of the bottle and which comprises an upper part, movable by vertical sliding in a fixed part 4. The fixed part 4 is fixed to the bottle, at its upper end 4*a*, via the crimping cap C1 described above. The hollow fixed part 4 of the pump extends inside the bottle and is provided, at its lower end 4*b*, with a suction tube t plunging into the liquid in the bottle. The hollow fixed part 4 of the pump also comprises a low check valve Cb, for example of the ball type, which is closed in the position of FIG. 3A in order to prevent the passage of liquid from the bottle inside the chamber 4*c* of the hollow fixed part 4 of the pump. The upper movable part of the pump comprises a hollow actuating pin 5 which projects through an upper end 5*a* opening beyond the cap C1 and which rests at its opposite lower end 5*b* on a piece forming a piston 6. The piece forming a piston 6 is mounted on a return spring 7 and is able to slide vertically in the chamber 4*c* of the fixed part 4 of the pump. At the lower end 5*b* of the actuating pin 5 a high check valve Ch, for example of the ball type, is provided to allow, depending on the position of the check valve, here of the ball (check valve closed in the position of FIG. 3A), the passage of liquid from the chamber 4*c* inside the actuating pin 5. The bottle R also comprises a dispensing push-button or diffuser 8 mounted on the open end 5*a* of the actuating pin and on which the user exerts a downward vertical pressure (as indicated by the arrow in FIG. 3B) in order to distribute liquid from the container, through the pump, then outside. It will be noted that when the user presses the dispensing push-button 8 (FIG. 3B), the actuating pin 5 of the pump is depressed into the low position. In this position, a peripheral port o1 surrounding the actuating pin 5 is open so as to allow the passage of external compensation air inside the fixed part 4 of the pump. Moreover, in this position, the piston 6 on which the actuating pin 5 rests descends below an opening o2 made in the wall of the fixed part 4 of the pump. Thus, the outside air surrounding the bottle can be introduced through the peripheral port o1 around the pin, then through the opening o2 in the wall to penetrate inside the container and thus compensate for the volume of liquid distributed. The passage thus created for the compensation air (port o1 and opening o2) when the pump is depressed constitutes a venting of the bottle R which is used in the embodiment of FIGS. 2 and 4 (after removal of the dispensing push-button of FIGS. 3A-B) to introduce liquid into the inverted bottle R to be recharged, from the liquid in the source bottle. When the bottle R is inverted and liquid is thus introduced inside the container, the air present in this container passes through the suction tube t, the chamber 4*c* of the fixed part 4 of the pump and the actuation pin 5 to be evacuated to the outside as will be seen later.

As shown in FIG. 2, the pump of the second inverted bottle R comprises a fixed part 30 which projects outside the bottle, beyond the crimped cap C1 (this fixed part here has a substantially cylindrical shape) and, at a free end of this fixed part, an axially sliding pin 32 extends axially away from the fixed part (downward in FIG. 2). This pin 32 is capable of being in two positions, namely an extended position relative to the fixed part 30, position in which the vent port of the pump is closed, and a depressed position inside the fixed part 30, position in which the vent port of the pump is open, as well as the internal check valves of the pump mechanism.

When the inverted bottle R is contacted with the valve of the filling interface 10 by a user, the fixed part 30 of the pump is more particularly supported by its external periphery (here it is a free edge forming an external diameter of the fixed part), on the flared internal face 18*b* (internal truncated cone) of the first receptacle 18 of the first part 12 of the valve, while the pin 32 is supported in the cavity 20 (second receptacle). The pin 32 contacts through its free end 32*a* the bottom 20*a* of this cavity and the internal conduit of the pin thus communicates with the end P4.1 of the passage P4. This passage thus communicates with the interior of the pin and with the fluid path which passes through the internal mechanism of the pump and allows access to the reservoir of the bottle R. In this exemplary embodiment, the cavity 20 has a substantially cylindrical general internal shape but, in other embodiments, the cavity can be in other shapes.

During this support, the user applies a downward vertical force to the inverted bottle R following the arrow F1 (FIG. 2). This force of determined intensity is called depression force and allows to cause the pump to be depressed inside the bottle, namely here the depression (retraction) of the axial pin 32 into the fixed part 30, which opens the vent port of the bottle R. The depression force which allows to obtain the depression of the pump, and therefore the opening of the vent, corresponds to a force of determined intensity, for example of the order of 2.5 kg. By applying this force to the first part 12 of the valve, the user does not deform the latter. Thus, the two disjointed liquid parts P1 and P2 are not joined (the liquid passage is obstructed) and the liquid under pressure in the source bottle S cannot therefore be transferred from this bottle to the bottle R. The intensity of this force is less than the intensity of the deformation force mentioned above.

Figure 4:
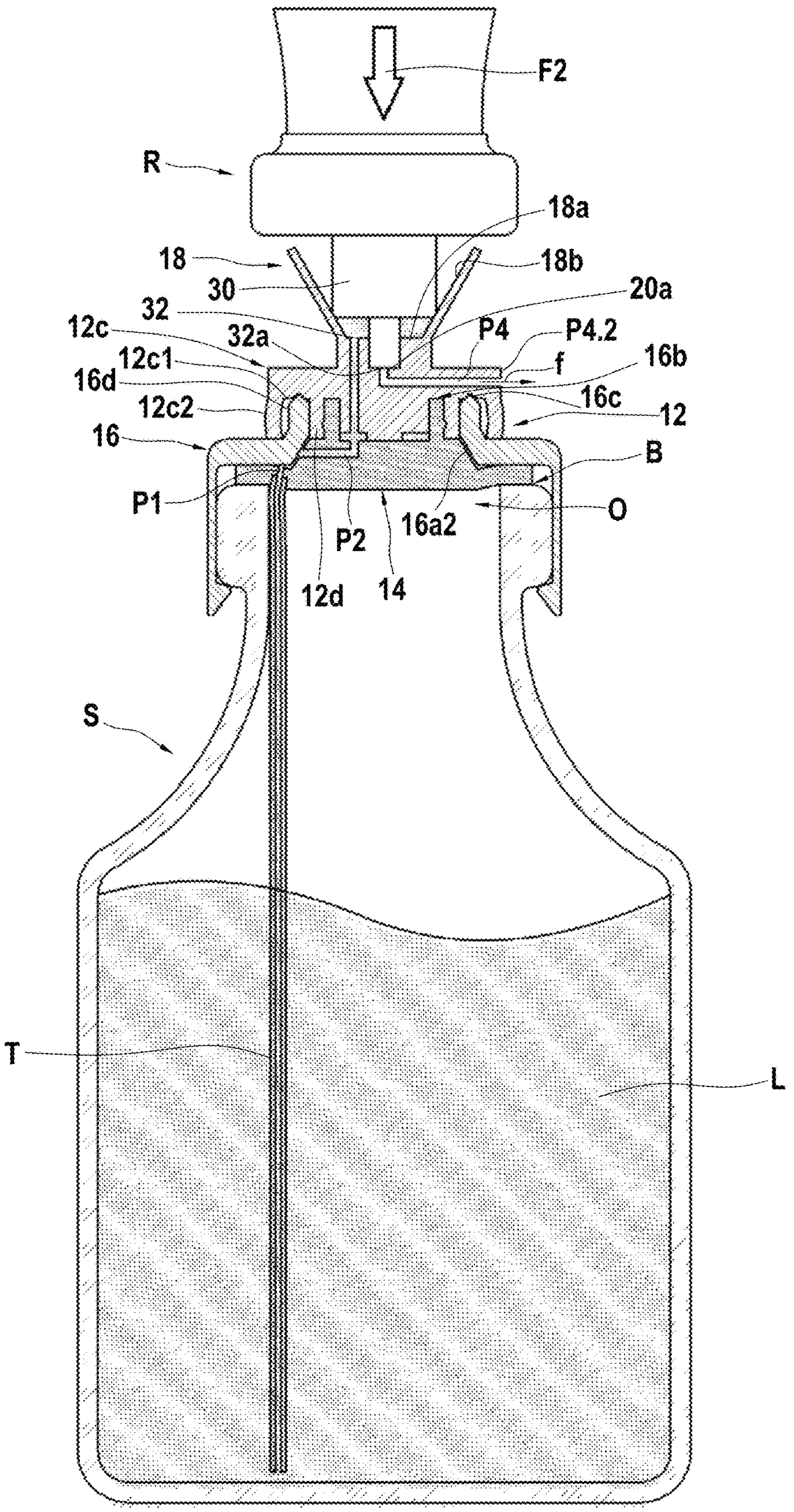
FIG. 4 is a schematic view in longitudinal section of the complete system of FIG. 2 during the refilling of the bottle R with liquid.

FIG. 4 illustrates the liquid transfer phase from the source bottle to the inverted bottle R. This phase is implemented when the user applies a downward vertical force to the inverted bottle R following the arrow F2 (FIG. 3) which has an intensity at least equal to the intensity of the deformation force mentioned above. In the example described, the force applied is 3 kg. The applied force F2 is transmitted to the valve and in particular to the areas thereof which are in contact with the pump of the bottle to be recharged. More particularly, the fixed part 30 presses on the internal face 18*b* of the flared receptacle 18 and the pin 32 presses on the bottom 20*a* of the cavity 20, which elastically deforms the two valve parts 12 and 14. The part 12 is crushed by vertical compression, which causes external bending or buckling of the cylindrical skirt 12*c*2 and the upper peripheral free edge 16*c* of the intermediate piece 16 penetrates into the bottom of the groove 12*c*1, in the material of the part 12. Thus, not only, sealing is ensured between the intermediate piece 16 and the first valve part 12 as described above (cylindrical contact between neck 16*d* and portion 12*d* of the central part 12*a* of the first valve part 12) but the engagement of the free edge 16*c* (with the described shape or a functionally equivalent shape) in the groove of the intermediate piece 16 improves/reinforces this sealing. It will also be noted that the external bending of the skirt 12*c*2 provides an elastic effect which is similar to that of a spring and which contributes to raising the first valve part (to make it return to its initial undeformed shape) when the vertical support force ceases. The cooperation between the free edge 16*c* (with the described shape or a functionally equivalent shape) and the groove of the intermediate piece 16 also contributes to returning the first valve part to its initial undeformed position. At the same time, the depression of the part 12 into the opening 16*b* vertically deforms the lower part 14 in its central zone which is not maintained between the intermediate piece 16 and the edge B of the bottle S. This downward elastic deformation (in the central opening O) of the central part tends to move this part away from the internal face 16*a*2 of the intermediate piece 16, which separates the opening ends of the parts P1 and P2 from the internal face 16*a*2. Fluid communication between the two parts P1 and P2 is thus authorized and, to the extent that the liquid L of the bottle is under pressure in the bottle S, the pressure exerted on the liquid causes its circulation in the dip tube, in the portions P1, P2 and P3, in the space between the bottom 18*a* of the receptacle and the fixed part, then inside the latter through the vent port, into the reservoir of the bottle R. Correspondingly, when liquid is transferred from bottle S to bottle R, the air contained in the latter is evacuated by the internal mechanism of the depressed pump (open internal check valves) up to the end 32*a* of the pin, then in the passage P4 before escaping towards the outside of the interface 10, as indicated by the lateral arrow f.

The implementation of the system of FIG. 4 thus allows to simply and efficiently transfer liquid from the source bottle S to the bottle R to be recharged, without needing to dismantle the pump of the latter, and using a filling interface with elastically deformable valve which does not use moving pieces such as metal springs or other organs. Only the elastic deformation capacity of the two parts of the valve is used to switch from a closed or obstructed state of the valve to an open state of the valve and allowing the transfer of the liquid under pressure. The elastic deformation of the valve allows to open the liquid passage portion which is in two disjointed parts and thus to establish liquid communication between these two parts which, in the undeformed position of the valve, are separated from one another.

Figure 5:
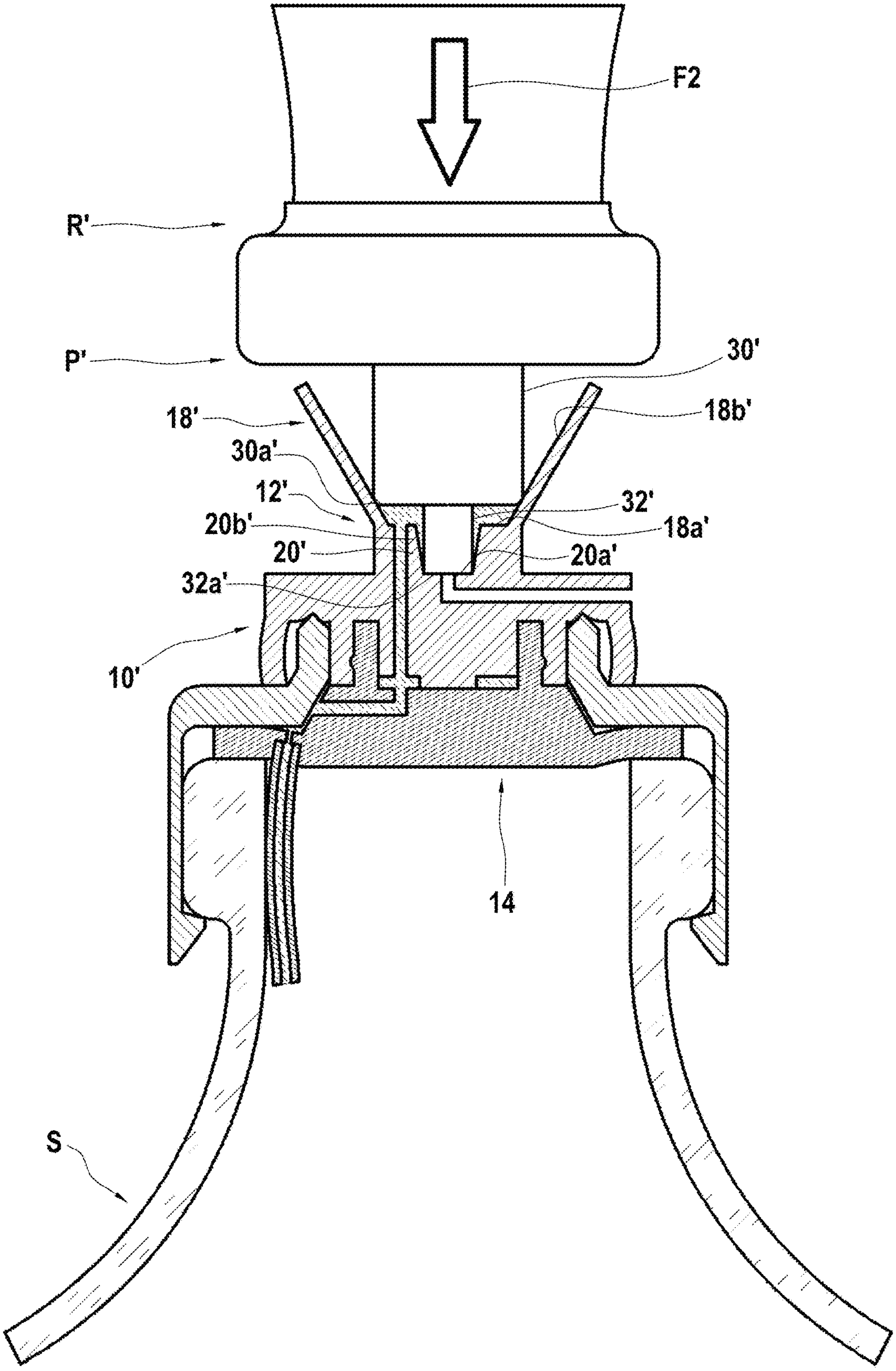
FIG. 5 is a schematic view in longitudinal section of a complete refilling system according to another embodiment.

FIGS. 5 and 6 illustrate (refilling condition with a deformation force F2 applied by the user) another embodiment of the invention according to which the filling interface can adapt to different pump diameters of the bottle to be refilled. Indeed, the pumps existing on the market have configurations fairly similar to each other, but their dimensions are however likely to vary depending on the manufacturer. Thus, a pump A manufactured by a manufacturer can have, for the fixed part 30, a diameter of 9.3 mm and an opening length of 8.7 mm in FIG. 2 and, for the pin 32, a diameter of 3 mm and an opening length of 7.3 mm, while a pump B manufactured by another manufacturer can have, for the fixed part 30, a diameter of 12.1 mm and an opening length of 8 mm of FIG. 2 and, for the pin 32, a diameter of 3.7 mm and an opening length of 7 mm.

To be able to adapt and therefore interface with pumps whose dimensions may differ from one pump to another, the two receptacles of the filling interface, in particular of the first valve part 12, respectively have a shape flared towards the outside of the valve, for example frustoconical, towards the fixed part 30 and the pin 32 of the pump of the bottle R. With such a configuration of the filling interface, on the one hand, the first receptacle is configured to be used as a support for fixed parts of pumps whose dimensions may vary from one pump to another and, on the other hand, the second receptacle is configured to be used as a support for pump pins whose dimensions may vary from one pump to another.

FIG. 5 schematically illustrates a filling interface 10' in which only the first valve part 12' was modified compared to part 12 of the previous figures. The second part 14 is unchanged.

The first valve part 12' comprises the first receptacle 18' of substantially frustoconical shape with its inclined internal face 18*b*', like the receptacle 18 of the preceding figures and which accommodates the fixed part 30' of the pump P' of the bottle R' supported on its external peripheral edge 30*a'*.

The first valve part 12' also includes a second receptacle 20' whose cavity was modified and now has a flared shape oriented upwards, just like the shape 18', with an inclined internal face 20*b'*.

In FIG. 5 the diameter of the pin 32' corresponds to the diameter of the bottom 20*a*' of the flared cavity 20.

Figure 6A:
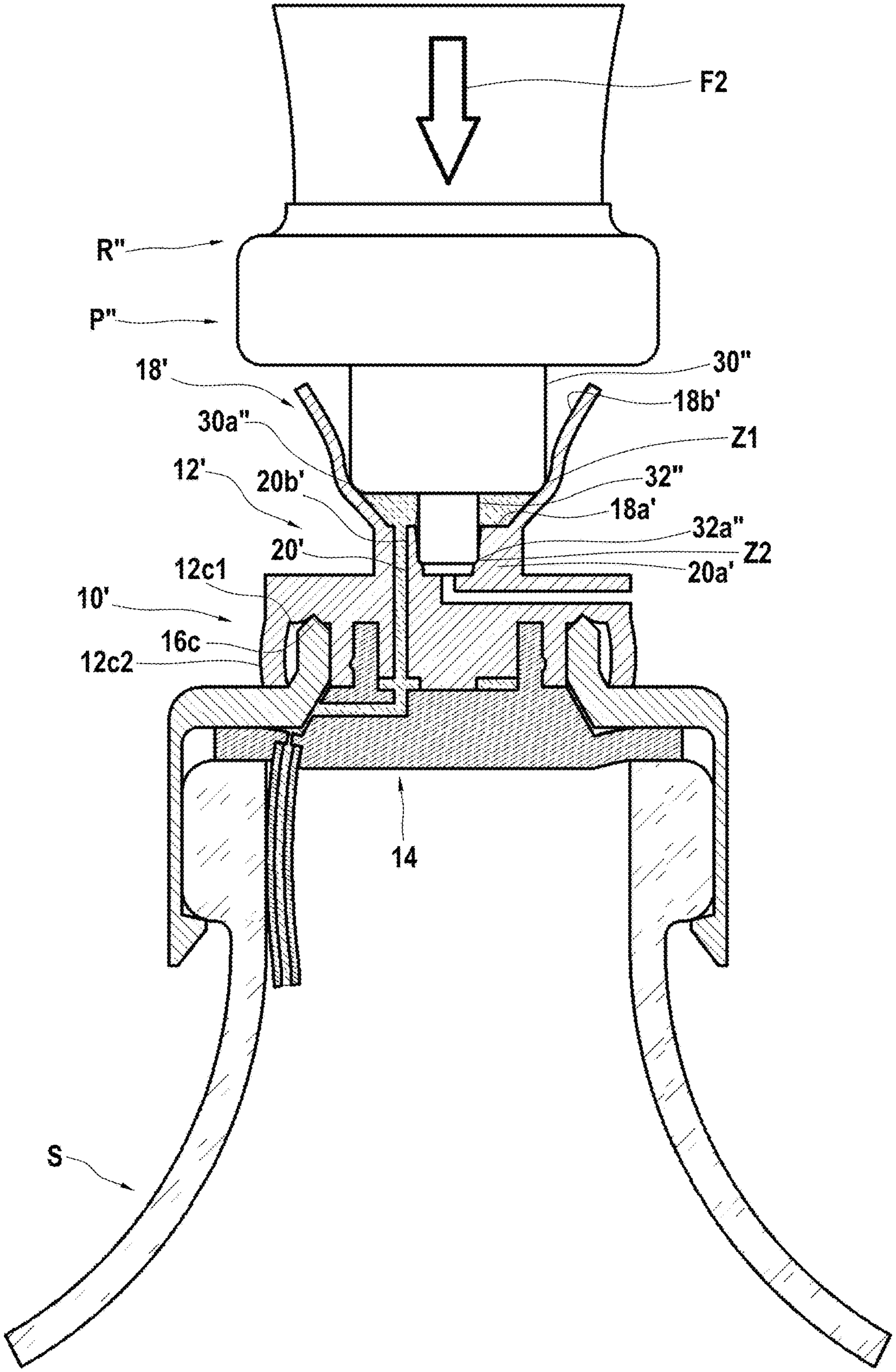
FIG. 6A is a schematic view of the system of FIG. 5 with a pump of different dimensions.

FIG. 6A shows a bottle R" with a pump P" of dimensions different from those of the bottle R' of FIG. 5 and illustrates the way in which the valve part 12' accommodates the members 30" and 32" of the pump P".

As shown in this figure, the external diameter of the fixed part 30" is greater than that of the fixed part 30' of FIG. 5 and is thus supported via its external peripheral edge 30*a*" against a contact zone Z1 of the inclined face 18*b*' which is higher, that is to say further away from the bottom 18*a*' of the cavity, than in FIG. 5. Under the vertical support force exerted by the external peripheral edge 30*a*" against the inclined face 18*b*', the receptacle 18' deforms in the contact zone Z1 by hollowing out, the part of the inclined face 18*b*' located above this zone in FIG. 6A tightens a little when closing the flare angle and the part of the inclined face 18*b*' located below the contact zone Z1 also deforms by flaring further (opening of the flare angle) under the effect of the weight exerted on the inclined face.

At the same time, the pin 32" whose diameter is greater than that of the pin 32' of FIG. 5 cannot go as far as the bottom 20*a*' of the flared cavity 20' and is supported, by its external peripheral edge 32*a*" against a contact zone Z2 of the inclined face 20*b*' of the cavity, at a distance from the bottom 20*a*', thus leaving a free space between the free end of the pin 32" and the bottom 20*a*', and laterally deforms the inclined face of the cavity as shown in FIG. 6A.

In the examples illustrated in FIGS. 5 and 6A, a sealed contact is made between the external peripheral edge 30*a*' (resp. 30*a*") of the fixed part 30' (resp. 30") and the inclined face 18*b*', likewise that between the external peripheral edge 32*a*' (resp. 32*a*") of the pin 32' (resp. 32") and the bottom 20*a*' or the inclined face of the cavity 20*b*'. The inclined face 18*b*' of the first receptacle 18' (resp. 18) has a taper generally comprised between 80 and 100° and, for example, of the order of 90° (cone angle or flare angle between the two opposite walls visible in the longitudinal section of FIGS. 5 and 6A and which form a cone) to be able to accommodate a plurality of diameters of fixed parts of pumps from a predetermined range. Likewise, the inclined face 20*b*" of the second receptacle 20' has a lower taper, generally comprised between 5 and 25° and, for example of the order of 20° (cone angle or flare angle between the two opposite walls visible in the longitudinal section of FIGS. 5 and 6A and which form a cone) to be able to accommodate a plurality of pump pin diameters from a predetermined range.

Figure 6B:
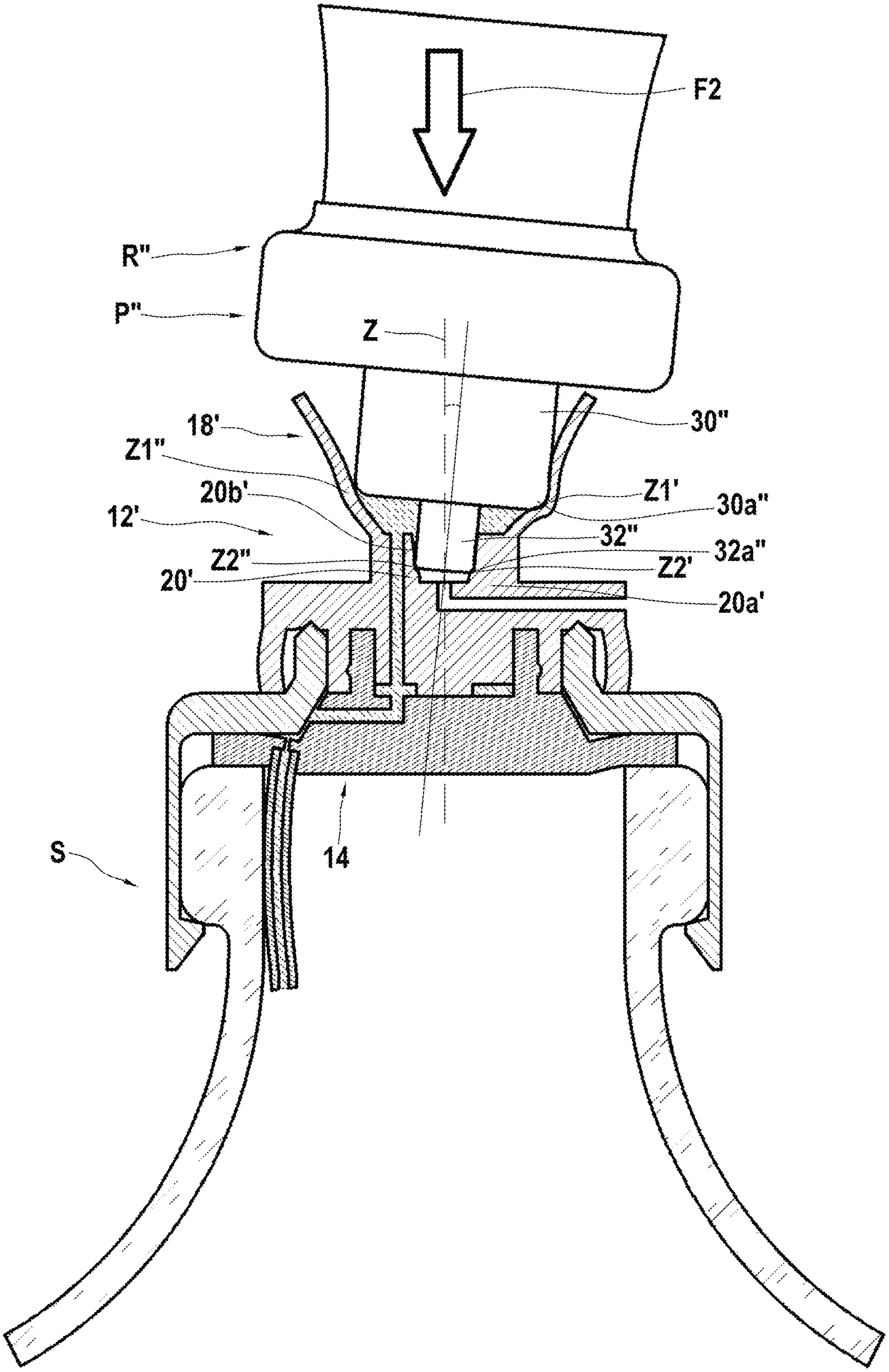
FIG. 6B is a schematic view of the system of FIG. 6A showing a misalignment of the pump with the vertical.

FIG. 6B repeats the configuration of FIG. 6A (the following principle also applies to other dimensions of pumps and pins as illustrated in FIG. 5) and illustrates the fact that the bottle R" to be recharged can, despite an inclination relative to the vertical along which the bottle S is arranged, generally in an angular range less than or equal to 15°, or even 10°, allow the implementation of the method as it has been described above. Thus, with an inclined bottle R" to be recharged, the fixed part 30" of the pump and the pin 32" for actuating the pump are inclined correspondingly and the operational contact with the receptacles 18' and 20' is ensured:

- the external diameter of the fixed pump part 30" is supported via its external peripheral edge 30*a*" against a contact zone Z1' of the inclined face 18*b*' which, thanks to its flexibility, elastically deforms with respect to the contact zone Z1 of FIG. 6A on the side where the bottle leans (on the diametrically opposite side the external peripheral edge 30*a*" remains in contact with a contact zone Z1" higher than Z1' and less deformed);
- the pin 32" is supported, via its external peripheral edge 32*a*", against a contact zone Z2' of the inclined face 20*b*' of the flared cavity 20' which, thanks to its flexibility, is elastically deformed compared to the contact zone Z2 of FIG. 6A on the side where the bottle leans (on the diametrically opposite side the external peripheral edge 32*a*" remains in contact with a contact zone Z2" higher than Z2' and less deformed).

The actions of depressing the pump and deforming the elastically deformable valve into two parts as described above are therefore possible even with an inclination of the bottle to be recharged.

For example, the first valve part 12, 12' is made of a flexible material such as an elastomer and the same is true for the second valve part 14. The intermediate piece 16 (for example: snap ring) is for example made of a rigid material in order to avoid any deformation during the implementation of the elastically deformable valve, for example made of polypropylene.

It will be noted that the flared shape of the first receptacle 18 of FIGS. 1, 2 and 4 already allowed to accommodate pumps with dimensions of fixed parts which differ from one to the other.

In the embodiment of the preceding figures, the liquid is under pressure inside the source bottle which is rigid. FIGS. 7A-10B illustrate different possible embodiments for pressurizing the liquid in the source bottle.

Figure 7A:
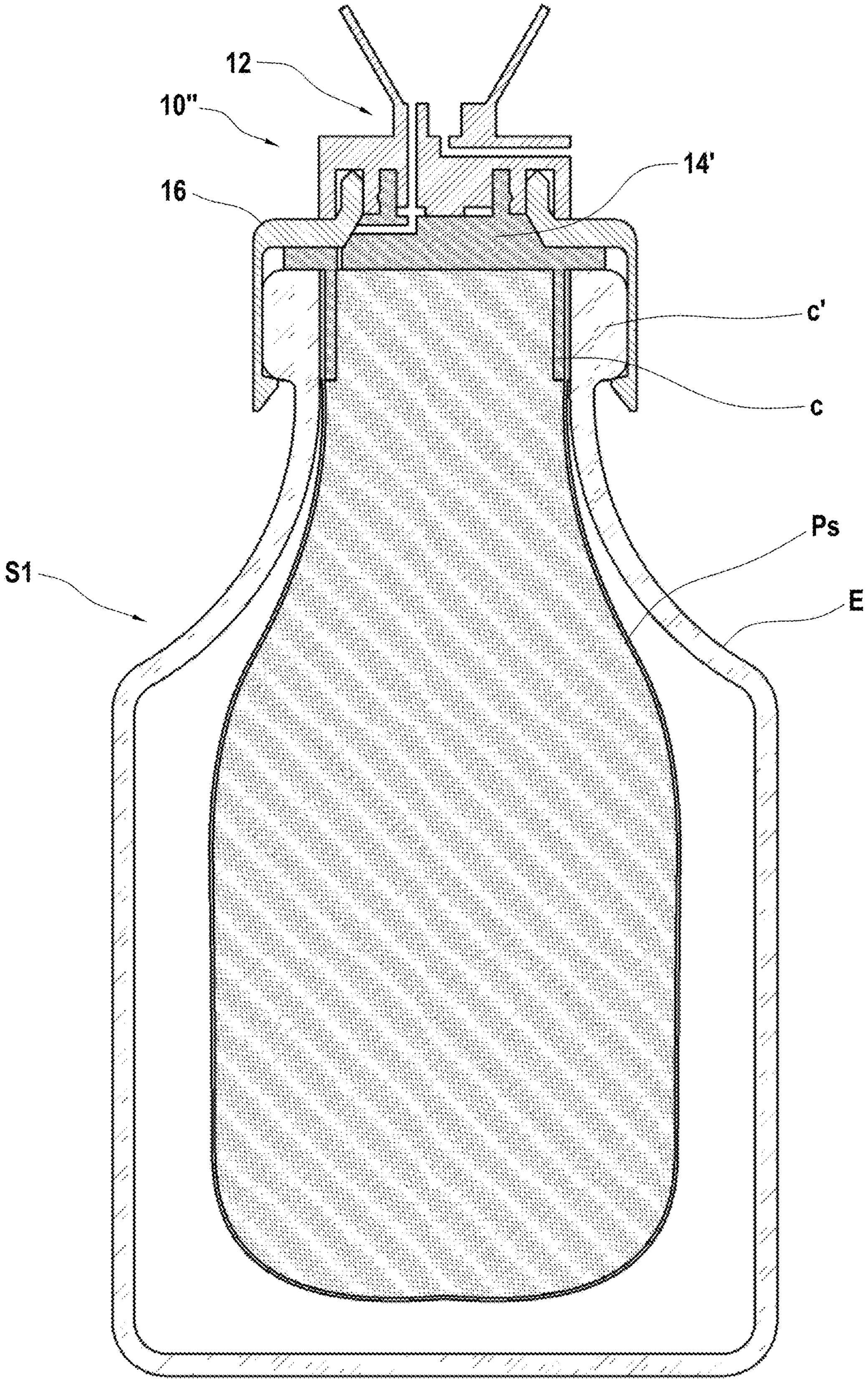
FIG. 7A is a schematic view in longitudinal section of a partial refilling system according to a first variant embodiment.
Figure 7B:
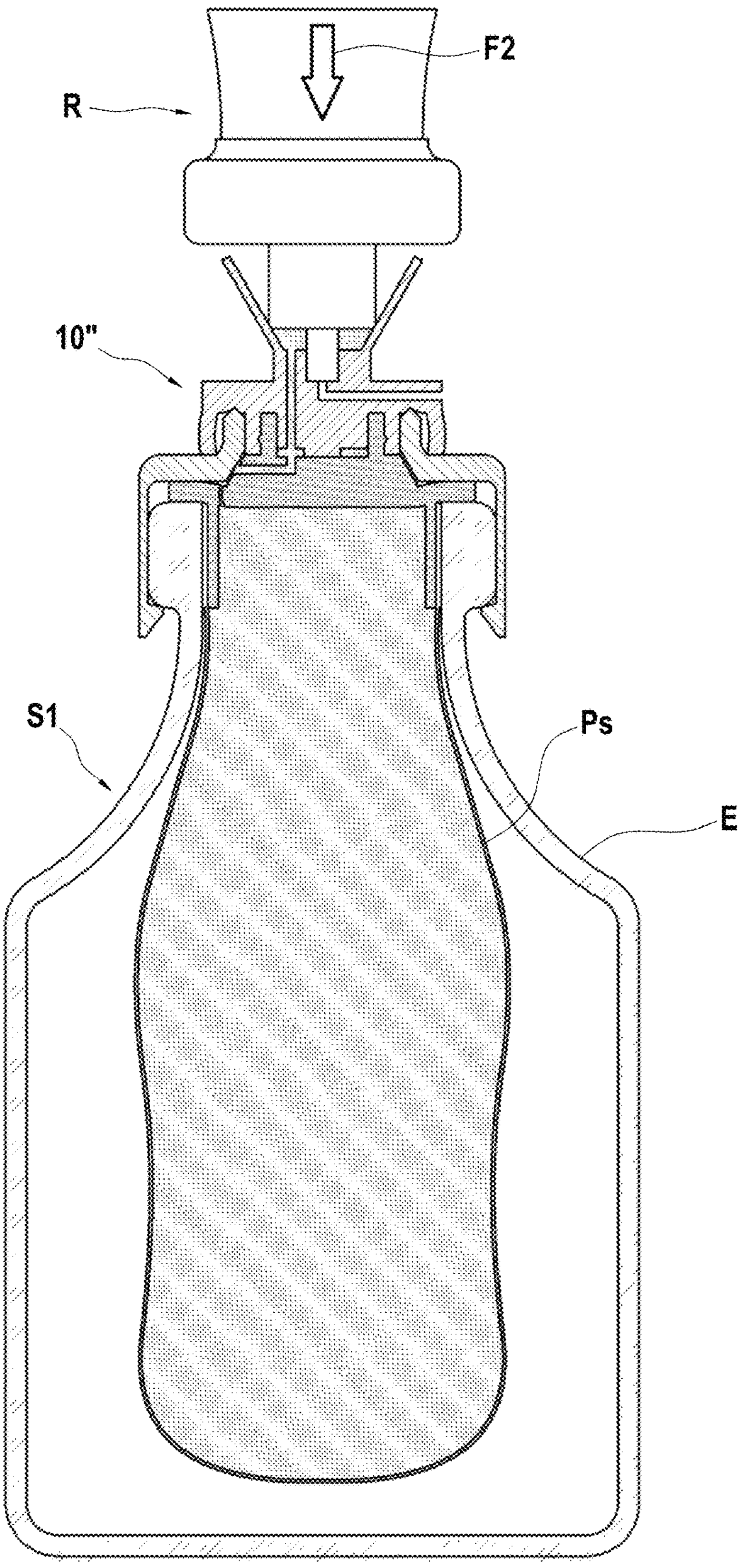
FIG. 7B is a schematic view in longitudinal section of the complete refilling system including the partial system of FIG. 7A during the refilling of the bottle R with liquid.

FIGS. 7A-7B illustrate a first embodiment in which the source bottle S1 comprises a rigid external envelope E which contains a flexible deformable pocket Ps subjected to the pressure of a gas present in the space between the envelope and the pocket. Everything that has been described previously regarding the two-part valve 12 (resp. 12'), 14 and the intermediate piece 16 applies here. On the other hand, here the intermediate piece 16 is fixed on the neck C' of the external envelope E and the second valve part 14' is slightly modified by the addition of a vertical internal cylindrical skirt 14'*a* (or vertical extension elements) which allows to pinch the neck c of the pocket between this vertical extension 14'*a* and the internal face of the neck C' of the envelope E, and therefore to maintain the pocket inside the envelope. In this variant the source bottle does not include a dip tube. FIG. 7A shows the partial system in an undeformed state of the valve. FIG. 7B shows the complete system with a bottle R to be refilled which is inverted and pressed against the filling interface 10" of the partial system of FIG. 7A. The deformation force F2 causes the valve to deform and open (as explained in detail above for the embodiment in FIGS. 1 to 4) in order to be able to transfer liquid under pressure from bottle S1 to bottle R.

Figure 8A:
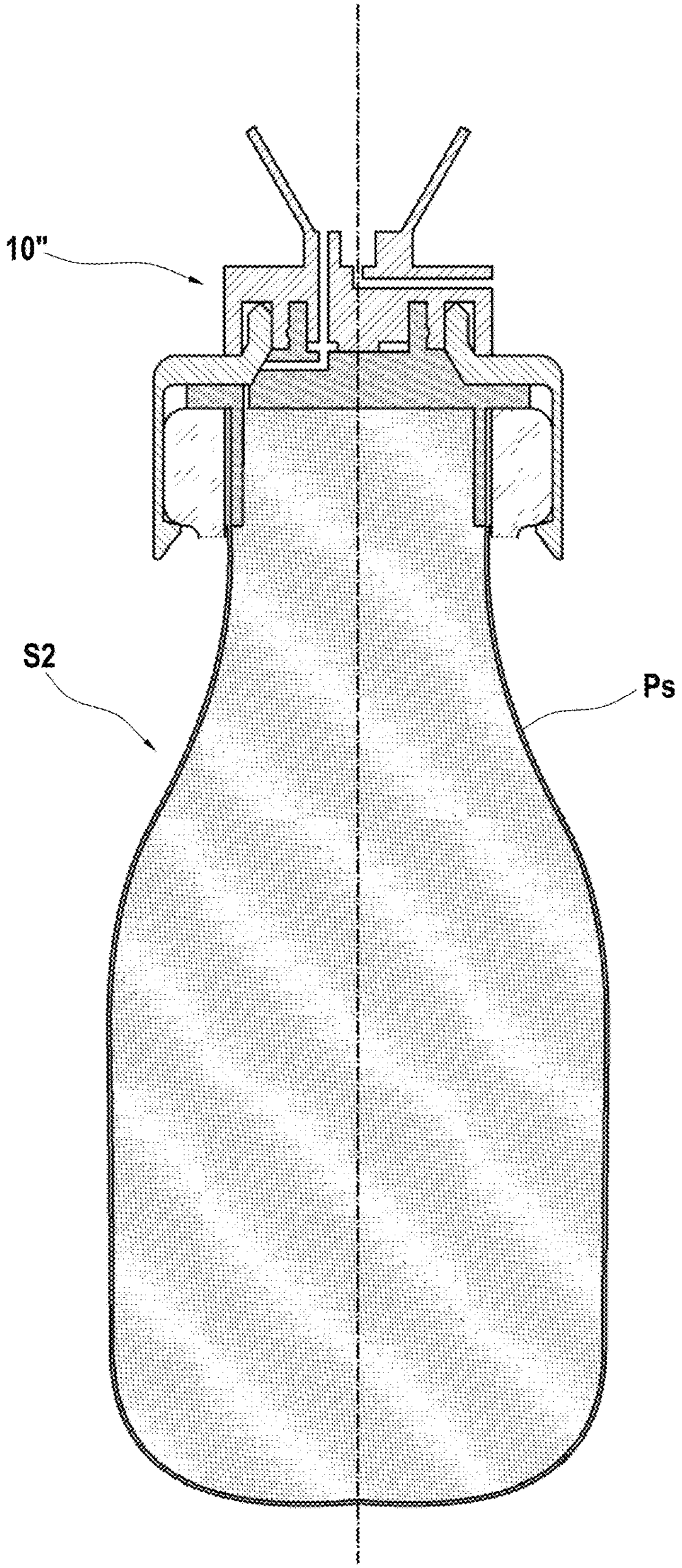
FIG. 8A is a schematic view in longitudinal section of a partial refilling system according to a second variant embodiment.
Figure 8B:
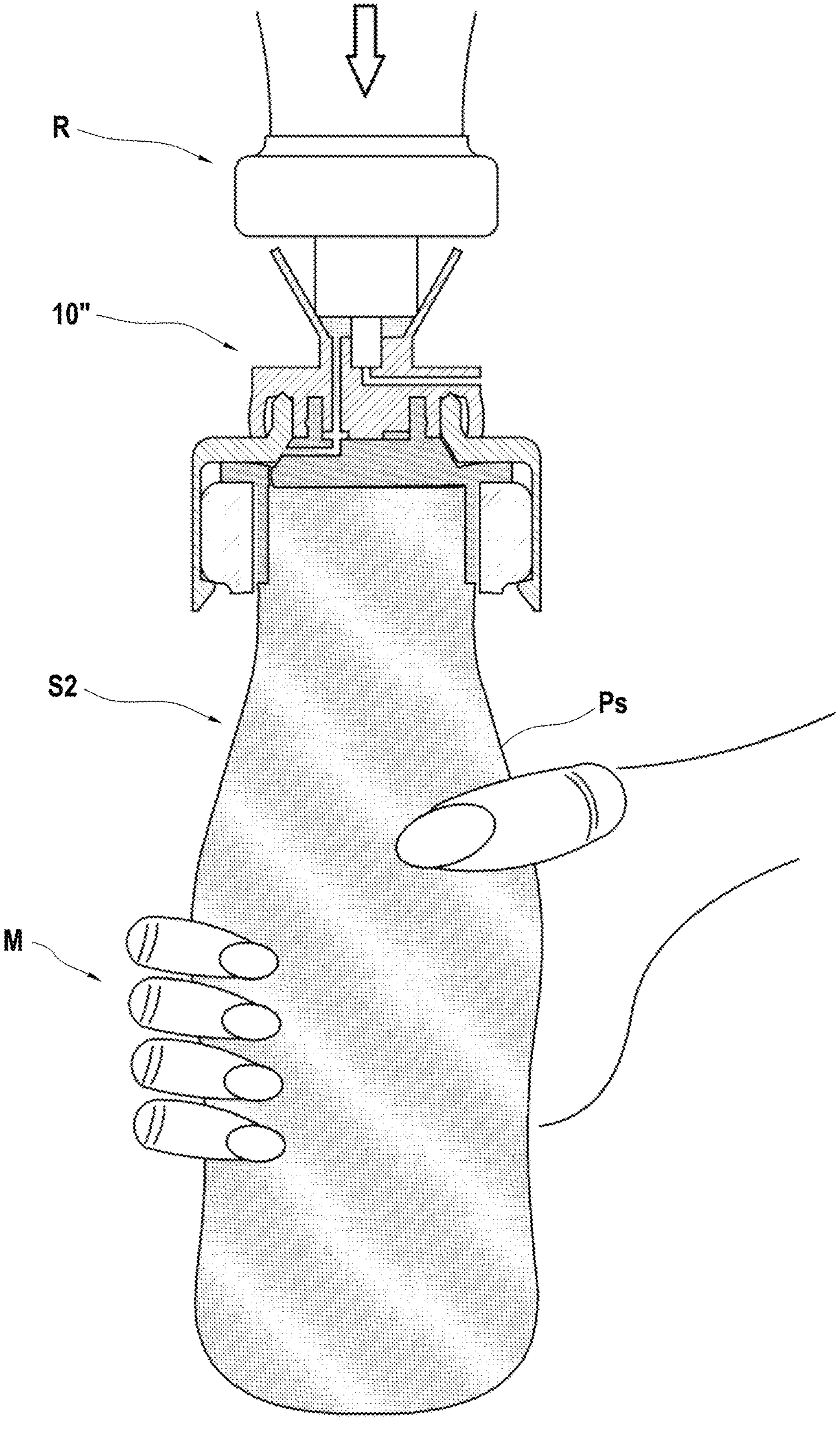
FIG. 8B is a schematic view in longitudinal section of the complete refilling system including the partial system of FIG. 8A during the refilling of the bottle R with liquid.

FIGS. 8A-8B illustrate a second embodiment which differs from the first embodiment of FIGS. 7A-B in that the source bottle S2 does not include a rigid envelope surrounding the deformable flexible pocket Ps. Thus, to pressurize the liquid in the bag, the user compresses the bag Ps with his hand M as shown in FIG. 7B.

Figure 9A:
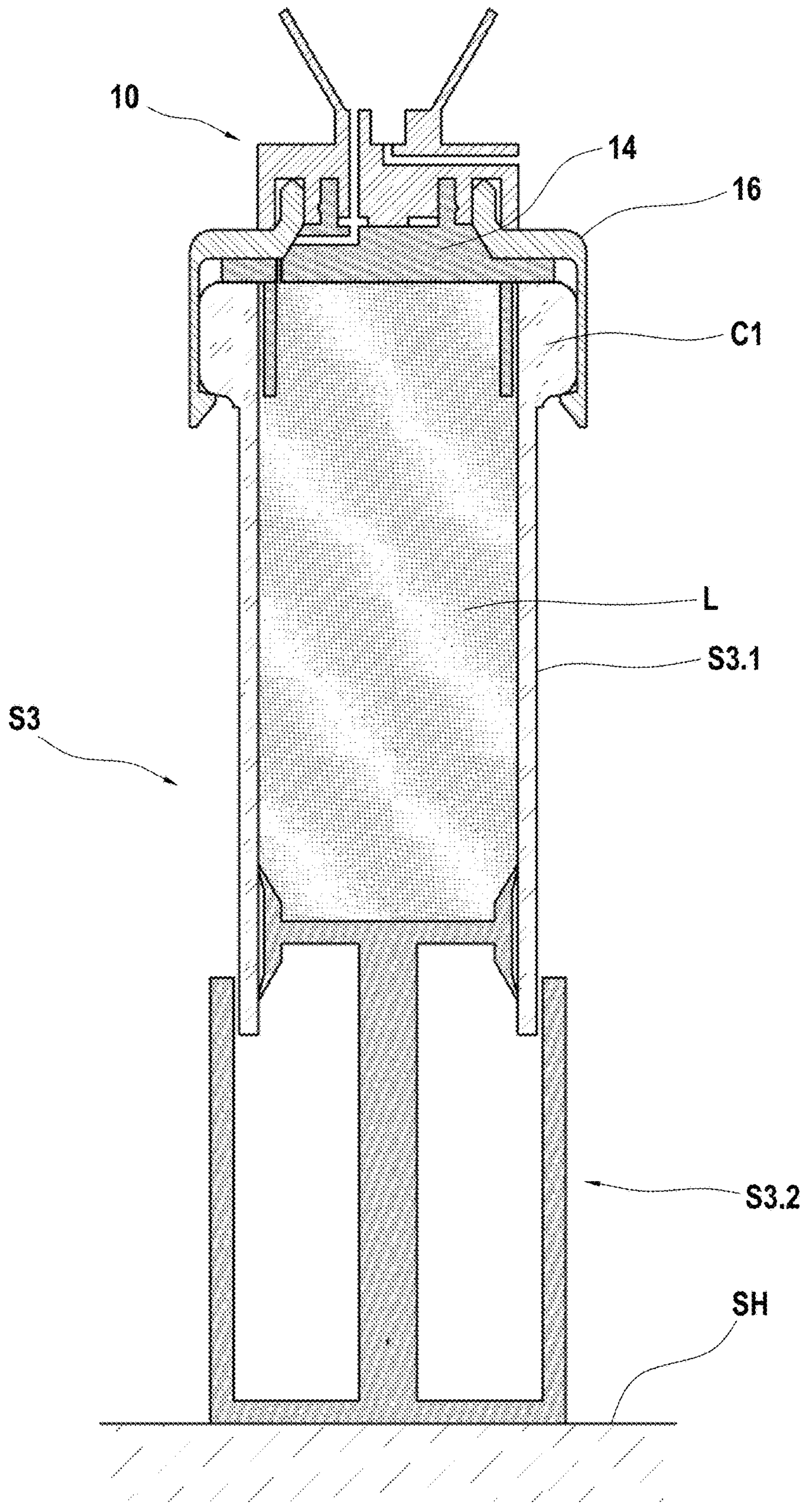
FIG. 9A is a schematic view in longitudinal section of a partial refilling system according to a third variant embodiment.
Figure 9B:
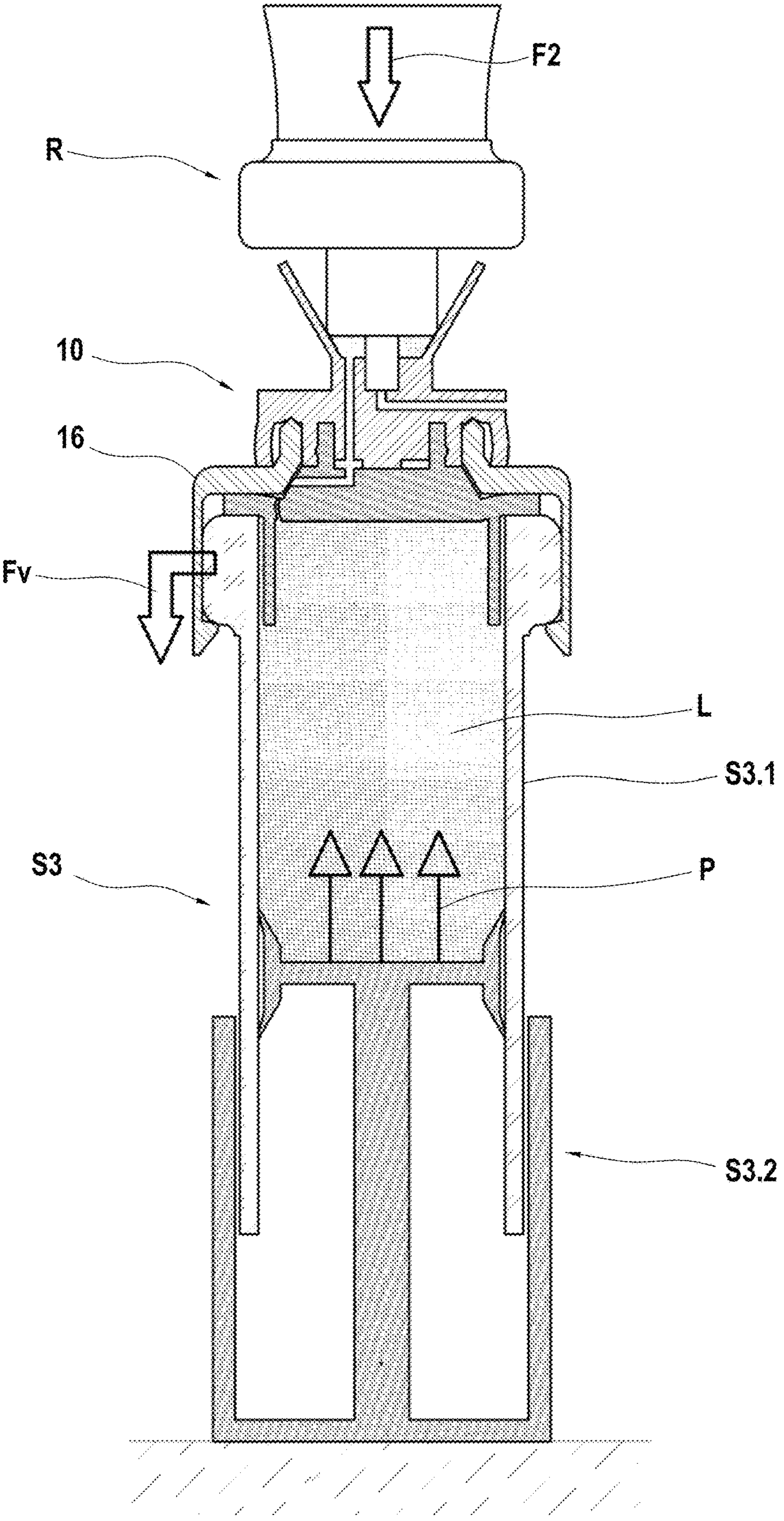
FIG. 9B is a schematic view in longitudinal section of the complete refilling system including the system part of FIG. 9A during the refilling of the bottle R with liquid.

FIGS. 9A-9B illustrate a third embodiment in which the source bottle S3 comprises a body forming a syringe S3.1 which is provided, at an upper end, with a neck c1 on which the intermediate piece 16 is mounted as already described above and which cooperates at its lower opposite end with a piston S3.2 mounted in a fixed support, for example disposed on a horizontal support SH. The syringe body S3.1 contains liquid L which is trapped in the internal volume delimited by the internal face of the wall of the body, the valve part 14 in the upper part and the upper face of the piston S3.2. When the user presses on the inverted bottle R with the deformation force F2, as for the other embodiments and variants, the valve deforms elastically so as to open it and, simultaneously, the body forming a syringe S3.1 slides down inside the piston S3.2 (arrow Fv), which exerts a pressure p on the liquid which is pushed into the liquid passage of the valve free of any obstruction, thus allowing liquid to be transferred from bottle S3 to bottle R.

Figure 10A:
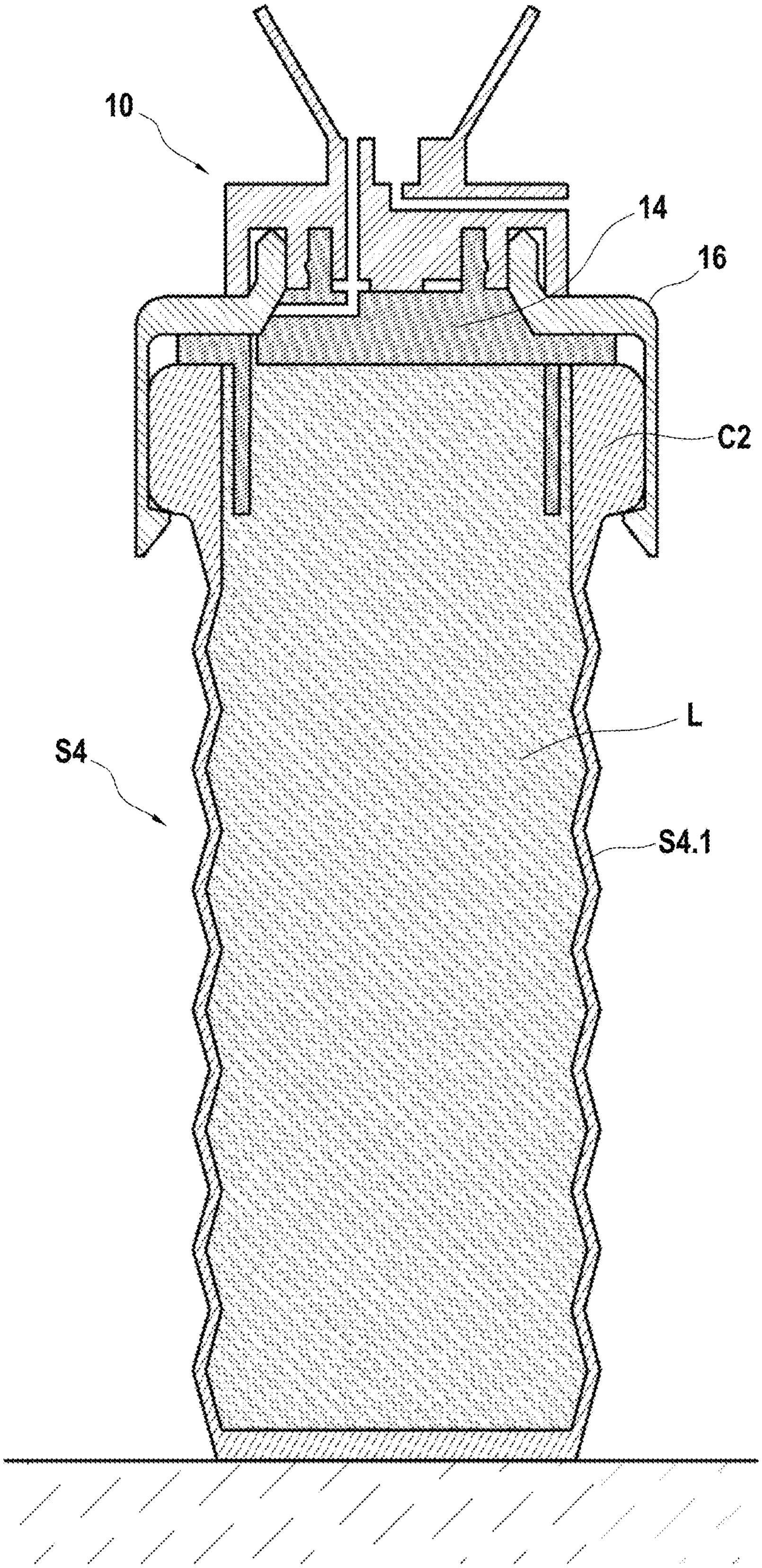
FIG. 10A is a schematic view in longitudinal section of a partial refilling system according to a fourth variant embodiment.
Figure 10B:
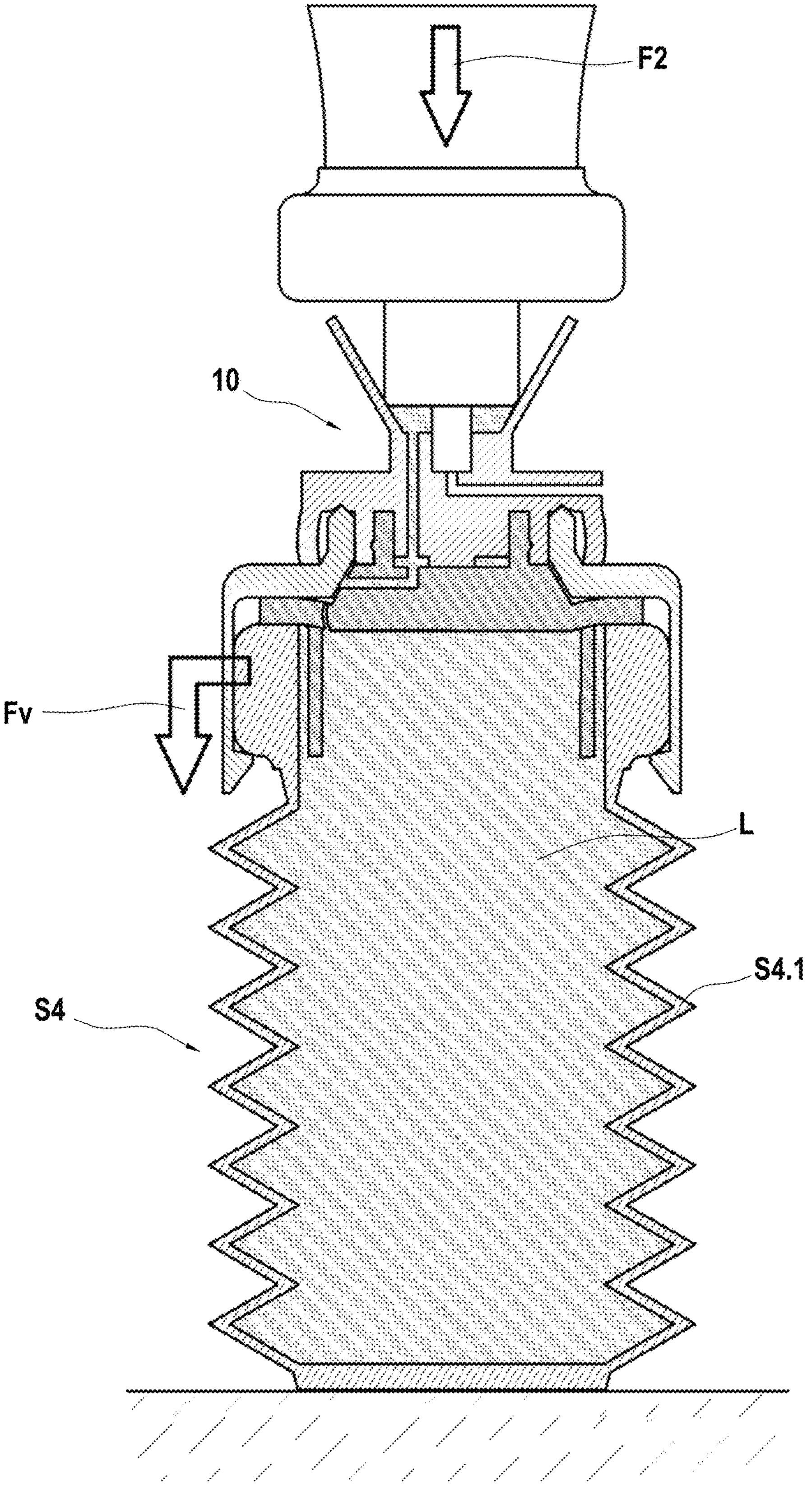
FIG. 10B is a schematic view in longitudinal section of the complete refilling system including the partial system of FIG. 10A during the refilling of the bottle R with liquid.

FIGS. 10A-10B illustrate a third embodiment in which the source bottle S4 comprises a body forming a bellow S4.1 which is provided, at an upper end, with a neck c2 on which the intermediate piece 16 is mounted as already described above. The opposite end of the body forming a bellow S4.1 is for example disposed on a horizontal support SH. The body forming a bellow S4.1 contains liquid L which is trapped in the internal volume delimited by the internal face of the wall of the body, the valve part 14 in the upper part and the internal face of the lower end of the body forming a bellow S4. When the user presses on the inverted bottle R with the deformation force F2, as for the other embodiments and variants, the valve deforms elastically so as to open it and, simultaneously, the body forming a bellow S4.1 compresses as it collapses (arrow Fv), which exerts pressure on the liquid which is pushed into the liquid passage of the valve free of any obstruction, thus allowing liquid to be transferred from bottle S4 to bottle R.

Note that, in the different variants described above, the filling interface can be in any shape among those described above with reference to FIGS. 1 to 6B.

The invention claimed is:

1. A system for refilling a bottle with liquid, comprising:

at least a first bottle containing liquid and comprising a bottom at one end and an opening for the liquid to exit the bottle at an opposite end, the opening being located above the bottom, at least a second bottle to be refilled with the liquid from the first bottle, the second bottle comprising a bottom at one end and a pump mounted on the bottle at an opposite end, the pump being equipped with at least one vent port which is capable of being opened or closed depending on the position of the pump, the second bottle being in the inverted position with the pump located below the bottom of said bottle, a filling interface disposed between the two bottles and comprising, on the one hand, at least one liquid passage for transferring the liquid under pressure, from the first bottle to the second inverted bottle through said opened at least one vent port of the pump of said second bottle and, on the other hand, at least one air passage for the evacuation of the air contained in the second inverted bottle towards the outside of said bottle, characterized in that the filling interface includes an elastically deformable valve comprising two parts which are elastically deformable under the action of a downward vertical force, called deformation force, exerted on the second inverted bottle and having a predetermined intensity, each part of the valve comprising a portion of said at least one liquid passage, the two parts of the valve comprising:

a first part disposed opposite the pump of the second inverted bottle and which is configured to be used as a support for the pump without deforming under the action of a downward vertical force, called depression force, which is exerted on the second inverted bottle so as to depress the pump inside this second bottle in order to open said at least one vent port, a second part disposed, on the one hand, below the first part and against it and, on the other hand, opposite or inside the opening of the first bottle, the second part being configured to be in two states, namely a first non-elastically deformed state in which the portion of said at least one liquid passage which extends inside the second non-deformed part of the valve is obstructed and, a second elastically deformed state in which the second part is elastically deformed and the portion of said at least one liquid passage is no longer obstructed, the second elastically deformed state being obtained under the action of a downward vertical force which is exerted on the second inverted bottle and which has an intensity at least equal to the predetermined intensity of the deformation force.

2. The system for refilling a bottle with liquid according to claim 1, characterized in that the pump mounted on the second inverted bottle comprises a fixed part at one end of which extends, away from the fixed part, a sliding pin which is capable of adopting, on the one hand, a depressed position inside the fixed part and said at least one vent port of the pump is open in this depressed position and, on the other hand, an extended position relative to the fixed part and said at least one vent port of the pump is closed in this extended position, the first part of the valve being disposed opposite the fixed part and the sliding pin of the pump and comprising, on the one hand, a first receptacle configured to be used as a support for the fixed part of the pump and, on the other hand, a second receptacle configured to be used as a support for the pin of the pump.

3. The system for refilling a bottle with liquid according to claim 2, characterized in that the first receptacle and the second receptacle respectively have a flared shape towards the fixed part and the pin of the pump so that, on the one hand, the first receptacle is configured to be used as a support for fixed parts of pumps of different dimensions and, on the other hand, the second receptacle is configured to be used as a support for pins of pumps of different dimensions.

4. The system for refilling a bottle with liquid according to claim 3, characterized in that the first receptacle and the second receptacle respectively have a flared shape towards the fixed part and the pin of the pump which is configured to be used as a support respectively for a fixed pump part and for the pin of the pump which have an inclination relative to the vertical.

5. The system for refilling a bottle with liquid according to claim 4, characterized in that the flared shape of each receptacle is frustoconical.

6. The system for refilling a bottle with liquid according to claim 5, characterized in that the frustoconical shape of the first receptacle is defined by a cone angle comprised between 80° and 100° and/or the frustoconical shape of the second receptacle is defined by a cone angle comprised between 5° and 25°.

7. The system for refilling a bottle with liquid according to claim 3, characterized in that the flared shape of each receptacle is frustoconical.

8. The system for refilling a bottle with liquid according to claim 7, characterized in that the frustoconical shape of the first receptacle is defined by a cone angle comprised between 80° and 100° and/or the frustoconical shape of the second receptacle is defined by a cone angle comprised between 5° and 25°.

9. The system for refilling a bottle with liquid according to claim 2, characterized in that the first receptacle and the second receptacle respectively have a flared shape towards the fixed part and the pin of the pump which is configured to be used as a support respectively for a fixed pump part and for the pin of the pump which have an inclination relative to the vertical.

10. The system for refilling a bottle with liquid according to claim 9, characterized in that the flared shape of each receptacle is frustoconical.

11. The system for refilling a bottle with liquid according to claim 10, characterized in that the frustoconical shape of the first receptacle is defined by a cone angle comprised between 80° and 100° and/or the frustoconical shape of the second receptacle is defined by a cone angle comprised between 5° and 25°.

12. The system for refilling a bottle with liquid according to claim 1, characterized in that the portion of said at least one liquid passage which extends inside the second part of the valve is made in two parts which are disjointed when the second part of the valve is not deformed and which communicate with each other when the second part of the valve is deformed.

13. The system for refilling a bottle with liquid according to claim 1, characterized in that the filling interface includes an intermediate piece which is mounted on the first bottle and on which is supported the valve.

14. The system for refilling a bottle with liquid according to claim 13, characterized in that the portion of said at least one liquid passage which extends inside the second part of the valve is made in two parts which are disjointed when the second part of the valve is not deformed and which communicate with each other when the second part of the valve is deformed, the second part of the valve being arranged against the intermediate support piece in such a way that, when the second part of the valve is not deformed, the two disjointed parts of the portion of said at least one liquid passage open onto the intermediate support piece and, when the second part of the valve is deformed, the two parts of the portion of said at least one liquid passage move away from the intermediate support piece.

15. A method for refilling a bottle with liquid, characterized in that the method is implemented using a system which comprises:

at least a first bottle containing liquid and comprising a bottom at one end and an opening for the liquid to exit the bottle at an opposite end, the opening being located above the bottom, at least a second bottle to be refilled with the liquid from the first bottle, the second bottle comprising a bottom at one end and a pump mounted on the bottle at an opposite end, the pump being equipped with at least one vent port which is capable of being opened or closed depending on the position of the pump, the second bottle being in the inverted position with the pump located below the bottom of said bottle, a filling interface disposed between the two bottles and comprising a valve comprising a first and a second elastically deformable parts which each include a portion of at least one liquid passage for the transfer of the liquid under pressure, from the first bottle to the second inverted bottle and, at least one air passage for evacuating the air contained in the second inverted bottle towards the outside of said bottle, the pump of the second inverted bottle being supported on the first part of the valve disposed opposite thereto and the second part of the valve being disposed, on the one hand, below the first part and against it and, on the other hand, opposite or inside the opening of the first bottle, the method comprising:

the application to the second inverted bottle of a downward vertical force, called depression force, having an intensity less than a predetermined intensity which corresponds to a deformation force, so that the pump of the second inverted bottle supported against the first valve part is depressed inside this second inverted bottle without deformation of the valve, in order to open said at least one vent port of the second inverted bottle, when the valve is not deformed, said at least one liquid passage being obstructed and preventing the transfer of the liquid under pressure from the first bottle to the second inverted bottle, the application to the second inverted bottle of a downward vertical force having an intensity at least equal to the predetermined intensity of the deformation force in order to elastically deform the first and second valve parts, and to free said at least one liquid passage from any obstruction to allow the transfer of the liquid under pressure from the first bottle to the second inverted bottle.

16. The method according to claim 15, characterized in that, to transfer liquid from the first bottle to the second inverted bottle:

either the liquid present in the first bottle is already under pressure when the force of intensity at least equal to the predetermined intensity of the deformation force is applied;

or a pressure is applied to the liquid present in the first bottle during the implementation of the method.

17. The method according to claim 15, characterized in that the first part of the valve comprising, on the one hand, a first receptacle of flared shape configured to be used as a support for a fixed part of the pump of the second inverted bottle and, on the other hand, a second receptacle of flared shape configured to be used as a support for the pin of said pump, the second inverted bottle being inclined relative to the vertical in such a way that the fixed part of the pump and the pin of said pump inclined relative to the vertical are respectively supported against the first receptacle and the second receptacle.

* * * * *